(12) United States Patent
Gansner et al.

(10) Patent No.: US 8,654,126 B2
(45) Date of Patent: Feb. 18, 2014

(54) METHODS, SYSTEMS, AND PRODUCTS FOR GRAPHING DATA TO REDUCE OVERLAP

(75) Inventors: Emden R. Gansner, Morristown, NJ (US); Yifan Hu, Mountain Lakes, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1024 days.

(21) Appl. No.: 12/332,477

(22) Filed: Dec. 11, 2008

(65) Prior Publication Data
US 2010/0149186 A1    Jun. 17, 2010

(51) Int. Cl.
*G06T 11/20*    (2006.01)

(52) U.S. Cl.
USPC ........................................................ 345/440

(58) Field of Classification Search
None
See application file for complete search history.

(56) References Cited

U.S. PATENT DOCUMENTS

| | | | |
|---|---|---|---|
| 5,568,636 A | 10/1996 | Koford | |
| 5,596,703 A | 1/1997 | Eick | |
| 5,754,444 A | 5/1998 | Koford | |
| 5,764,239 A | 6/1998 | Misue | |
| 5,835,085 A | 11/1998 | Eick | |
| 5,995,114 A | 11/1999 | Wegman | |
| 6,085,032 A | 7/2000 | Scepanovic | |
| 6,091,424 A * | 7/2000 | Madden et al. | 345/619 |
| 7,210,112 B2 | 4/2007 | DeHon | |
| 7,285,487 B2 | 10/2007 | DeHon | |
| 7,366,997 B1 | 4/2008 | Rahmat | |
| 2002/0196292 A1 | 12/2002 | Itoh | |
| 2005/0038533 A1* | 2/2005 | Farrell et al. | 700/73 |
| 2005/0076060 A1* | 4/2005 | Finn et al. | 707/104.1 |
| 2006/0290697 A1 | 12/2006 | Madden | |
| 2007/0022329 A1* | 1/2007 | Adamek et al. | 714/701 |
| 2007/0106780 A1 | 5/2007 | Farnham | |
| 2008/0094399 A1 | 4/2008 | Heinkel | |
| 2008/0222170 A1 | 9/2008 | Farnham | |
| 2009/0037507 A1* | 2/2009 | Rosman et al. | 708/441 |
| 2009/0185746 A1* | 7/2009 | Mian et al. | 382/209 |

OTHER PUBLICATIONS

Gansner et al., Topological Fisheye Views for Visualizing Large Graphs, 2004, IEEE Symposium on Information Visualization, pp. 175-182.*

Dwyer et al., DIG-COLA: Directed Graph Layout through Constrained Energy Minimization, 2005, IEEE Symposium on Information Visualization, pp. 65-72.*

Dwyer et al., Fast Node Overlap Removal, 2006, Lecture Notes in Computer Science, vol. 3843, pp. 153-164.*

* cited by examiner

*Primary Examiner* — Daniel Hajnik
*Assistant Examiner* — Anh-Tuan V Nguyen
(74) *Attorney, Agent, or Firm* — Scott P. Zimmerman, PLLC

(57) ABSTRACT

Methods, systems, and products are disclosed for graphing data. A layout is retrieved that comprises locations for vertices. A proximity graph is generated using triangulation. Nodal overlaps are removed.

19 Claims, 26 Drawing Sheets

FIG. 3

Proximity Stress Model-Based Overlap Removal Algorithm

Input: coordinates for each vertex, $z_i^0$, and bounding box width and height $\{w_i, h_i\}$, $i = 1, 2, \ldots, |V|$.
repeat
    Form a proximity graph $G_P$ of $z^0$ by Delaunay triangulation.
    Find the overlap factors (5) along all edges in $G_P$.
    Solve the proximity stress model (6) for $z$. Set $z^0 = z$.
until (no more overlaps along edges of $G_P$)
repeat
    Form a proximity graph $G_P$ of $z^0$ by Delaunay triangulation. Augment $G_P$ with edges
    Find all node overlaps using a scan-line algorithm. Augment $G_P$ with edges from node pairs that overlap.
    Find the overlap factor (5) along all edges of $G_P$.
    Solve the proximity stress model (6) for $z$. Set $z^0 = z$.
until (no more overlaps)

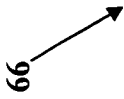

FIG. 4

| Graph | $|V|$ | $|E|$ | PRISM | VPSC | VORO | ODNLS |
|---|---|---|---|---|---|---|
| b100 | 1463 | 5806 | 1.44 | 14.85 | 350.7 | 258.9 |
| b102 | 302 | 611 | 0.14 | 0.10 | 4.36 | 5.7 |
| b124 | 79 | 281 | 0.03 | 0.01 | 0.02 | 0.5 |
| b143 | 135 | 366 | 0.04 | 0.01 | 0.47 | 1.3 |
| badvoro | 1235 | 1616 | 0.54 | 71.15 | 351.51 | 73.6 |
| mode | 213 | 269 | 0.09 | 0.09 | 2.15 | 2.1 |
| ngk10_4 | 50 | 100 | 0.01 | 0.00 | 0.02 | 0.14 |
| NaN | 76 | 121 | 0.01 | 0.01 | 0.11 | 0.27 |
| dpd | 36 | 108 | 0.01 | 0.01 | 0.02 | 0.1 |
| root | 1054 | 1083 | 0.89 | 7.81 | 398.49 | 46.9 |
| rowe | 43 | 68 | 0.00 | 0.00 | 0.04 | 0.1 |
| size | 47 | 55 | 0.01 | 0.00 | 0.06 | 0.09 |
| unix | 41 | 49 | 0.01 | 0.00 | 0.04 | 0.07 |
| xx | 302 | 611 | 0.13 | 0.10 | 8.19 | 5.67 |

FIG. 5

| Graph | PRISM | | | VPSC | | |
|---|---|---|---|---|---|---|
| | $\sigma_{dist}$ | $\sigma_{disp}$ | area | $\sigma_{dist}$ | $\sigma_{disp}$ | area |
| b100 | 0.74 | 0.38 | 14.05 | 0.76 | 0.72 | 18.91 |
| b102 | 0.44 | 0.25 | 2.45 | 0.58 | 0.8 | 2.71 |
| b124 | 0.65 | 0.37 | 1.04 | 0.78 | 0.73 | 0.91 |
| b143 | 0.59 | 0.35 | 1.5 | 0.78 | 0.83 | 2.16 |
| badvoro | 0.34 | 0.15 | 12.58 | 0.61 | 0.75 | 13.85 |
| mode | 0.59 | 0.37 | 0.79 | 1.02 | 0.77 | 1.29 |
| ngk10_4 | 0.41 | 0.16 | 0.33 | 0.39 | 0.3 | 0.25 |
| NaN | 0.4 | 0.2 | 0.72 | 0.54 | 0.65 | 0.71 |
| dpd | 0.34 | 0.18 | 0.25 | 0.51 | 0.4 | 0.18 |
| root | 0.71 | 0.3 | 16.99 | 0.6 | 0.75 | 17.68 |
| rowe | 0.33 | 0.14 | 0.22 | 0.44 | 0.31 | 0.19 |
| size | 0.37 | 0.2 | 0.47 | 0.77 | 0.74 | 0.4 |
| unix | 0.39 | 0.23 | 0.39 | 0.51 | 0.67 | 0.36 |
| xx | 0.42 | 0.25 | 3.96 | 0.57 | 0.82 | 3.9 |

| Graph | VORO | | | ODNLS | | |
|---|---|---|---|---|---|---|
| | $\sigma_{dist}$ | $\sigma_{disp}$ | area | $\sigma_{dist}$ | $\sigma_{disp}$ | area |
| b100 | - | - | - | 0.33 | 0.20 | 1.02E3 |
| b102 | 0.8 | 0.3 | 31.79 | 0.30 | 0.16 | 53.13 |
| b124 | 0.86 | 0.39 | 13.42 | 0.33 | 0.19 | 14.79 |
| b143 | 0.99 | 0.45 | 22.91 | 0.49 | 0.34 | 23.79 |
| badvoro | 2.29 | 0.65 | 3.01E3 | 0.31 | 0.26 | 318.66 |
| mode | 0.97 | 0.54 | 10.84 | 0.38 | 0.27 | 49.45 |
| ngk10_4 | 0.48 | 0.26 | 0.52 | 0.22 | 0.13 | 2.30 |
| NaN | 0.56 | 0.28 | 5.04 | 0.26 | 0.15 | 5.10 |
| dpd | 0.48 | 0.32 | 0.45 | 0.37 | 0.29 | 1.30 |
| root | 4.09 | 0.94 | 6.93E9 | 0.29 | 0.22 | 950.01 |
| rowe | 0.49 | 0.26 | 0.95 | 0.27 | 0.12 | 2.10 |
| size | 0.62 | 0.35 | 1.27 | 0.32 | 0.20 | 4.14 |
| unix | 0.6 | 0.35 | 0.85 | 0.26 | 0.13 | 2.35 |
| xx | 0.97 | 0.34 | 58.83 | 0.29 | 0.14 | 74.00 |

| Graph | PRISM | | | VPSC | | |
|---|---|---|---|---|---|---|
| | $\sigma_{dist}$ | $\sigma_{disp}$ | area | $\sigma_{dist}$ | $\sigma_{disp}$ | area |
| b100 | 0.74 | 0.36 | 14.59 | 0.95 | 0.62 | 25.33 |
| b102 | 0.41 | 0.18 | 2.62 | 0.44 | 0.33 | 2.77 |
| b124 | 0.52 | 0.12 | 3.39 | 0.28 | 0.06 | 3.04 |
| b143 | 0.5 | 0.22 | 2.59 | 0.67 | 0.41 | 4.26 |
| badvoro | 0.35 | 0.15 | 11.85 | 0.65 | 0.58 | 11.71 |
| mode | 0.57 | 0.35 | 0.78 | 0.84 | 0.59 | 1.45 |
| ngk10_4 | 0.25 | 0.05 | 0.54 | 0.16 | 0.03 | 0.53 |
| NaN | 0.25 | 0.06 | 1.15 | 0.15 | 0.04 | 1.15 |
| dpd | 0.14 | 0.03 | 0.54 | 0.1 | 0.03 | 0.53 |
| root | 0.73 | 0.28 | 16.02 | 0.73 | 0.7 | 25.93 |
| rowe | 0.16 | 0.04 | 0.38 | 0.11 | 0.03 | 0.38 |
| size | 0.35 | 0.11 | 0.54 | 0.28 | 0.08 | 0.57 |
| unix | 0.25 | 0.07 | 0.6 | 0.13 | 0.04 | 0.59 |
| xx | 0.39 | 0.18 | 4.23 | 0.45 | 0.34 | 4.54 |

| Graph | VORO | | | ODNLS | | |
|---|---|---|---|---|---|---|
| | $\sigma_{dist}$ | $\sigma_{disp}$ | area | $\sigma_{dist}$ | $\sigma_{disp}$ | area |
| b100 | - | - | - | 0.49 | 0.24 | 1.09E3 |
| b102 | 1.18 | 0.47 | 131.55 | 0.33 | 0.15 | 41.01 |
| b124 | 0.69 | 0.36 | 19.09 | 0.43 | 0.26 | 14.64 |
| b143 | 0.84 | 0.39 | 19.35 | 0.57 | 0.36 | 29.39 |
| badvoro | 3.8 | 0.9 | 4.45E5 | 0.34 | 0.10 | 166.53 |
| mode | 1.09 | 0.58 | 20.02 | 0.44 | 0.28 | 45.21 |
| ngk10_4 | 0.46 | 0.2 | 0.79 | 0.23 | 0.12 | 2.21 |
| NaN | 0.49 | 0.22 | 2.28 | 0.33 | 0.18 | 4.86 |
| dpd | 0.43 | 0.23 | 0.6 | 0.38 | 0.29 | 1.45 |
| root | 4.14 | 0.94 | 3.68E8 | 0.39 | 0.14 | 1.52E3 |
| rowe | 0.41 | 0.2 | 0.68 | 0.25 | 0.11 | 2.01 |
| size | 0.62 | 0.34 | 2.07 | 0.28 | 0.16 | 3.35 |
| unix | 0.55 | 0.24 | 0.64 | 0.20 | 0.09 | 2.01 |
| xx | 1.13 | 0.44 | 185.7 | 0.30 | 0.11 | 45.18 |

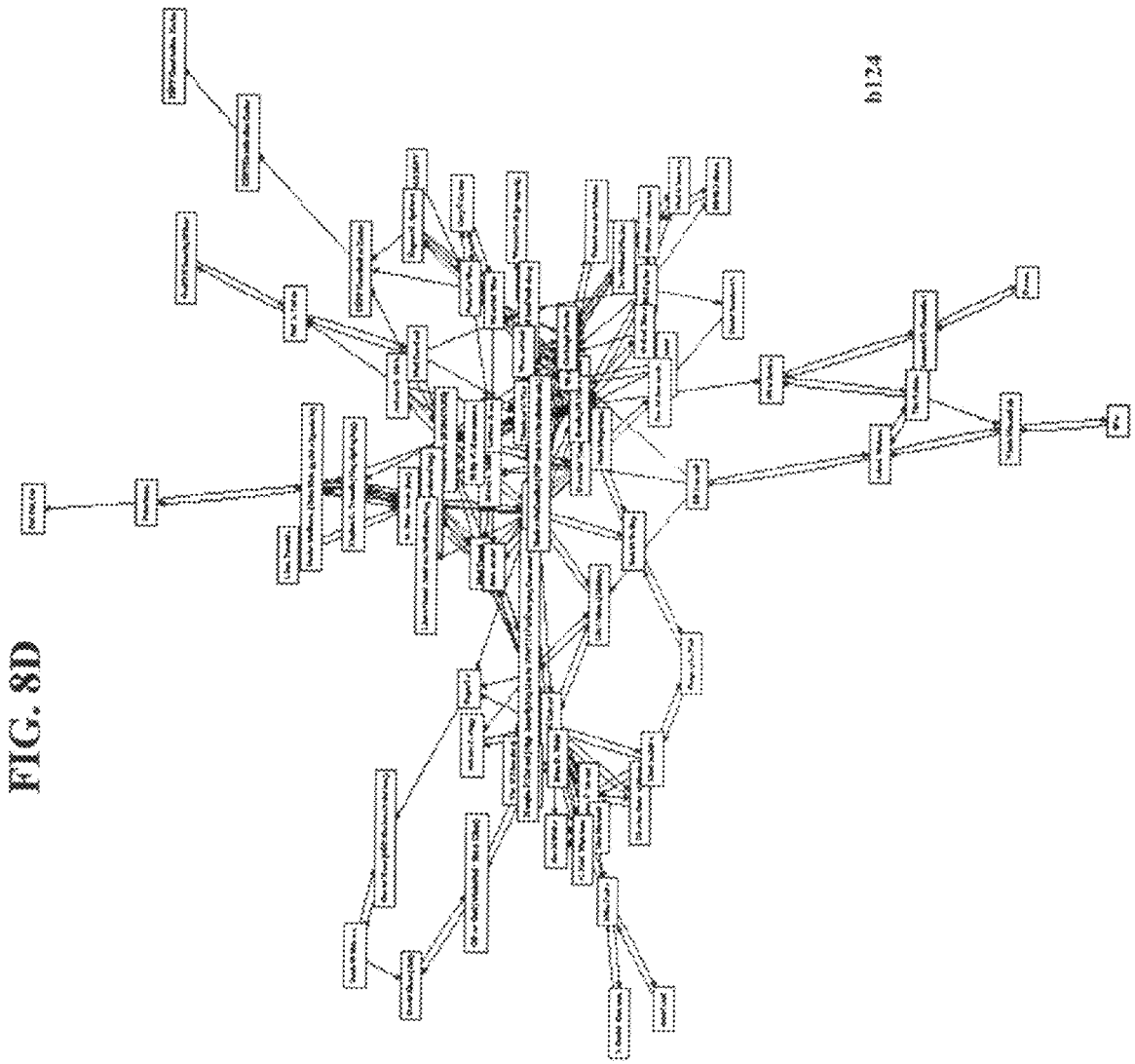

FIG. 9

| sizes | # of Graphs | PRISM $\sigma_{dist}$ | PRISM area | VPSC $\sigma_{dist}$ | VPSC area | VORO $\sigma_{dist}$ | VORO area | ODNLS $\sigma_{dist}$ | ODNLS area |
|---|---|---|---|---|---|---|---|---|---|
| 10-19 | 1407 | 0.009 | 0.16 | 0.09 | 0.061 | 0.14 | 0.069 | 0.07 | 0.34 |
| 20-29 | 839 | 0.02 | 0.27 | 0.11 | 0.12 | 0.14 | 0.15 | 0.078 | 0.92 |
| 30-39 | 2036 | 0.03 | 0.36 | 0.13 | 0.19 | 0.13 | 0.26 | 0.078 | 1.85 |
| 40-49 | 1800 | 0.035 | 0.43 | 0.14 | 0.25 | 0.12 | 0.36 | 0.074 | 2.71 |
| 50-59 | 1045 | 0.042 | 0.51 | 0.15 | 0.32 | 0.11 | 0.53 | 0.074 | 4.53 |
| 60-69 | 1172 | 0.046 | 0.58 | 0.17 | 0.39 | 0.11 | 0.70 | 0.074 | 6.18 |
| 70-79 | 1008 | 0.051 | 0.64 | 0.17 | 0.46 | 0.11 | 0.94 | 0.073 | 8.44 |
| 80-89 | 788 | 0.05 | 0.71 | 0.17 | 0.52 | 0.10 | 1.20 | 0.07 | 9.99 |
| 90-99 | 1296 | 0.054 | 0.78 | 0.18 | 0.59 | 0.10 | 1.49 | 0.069 | 13.26 |
| 100-109 | 140 | 0.055 | 0.82 | 0.18 | 0.61 | 0.10 | 1.7 | 0.068 | 14.14 |

FIG. 10

| Graph | $|V|$ | $|E|$ | A | B |
|---|---|---|---|---|
| b100 | 1463 | 5806 | 122 | 75 |
| b102 | 302 | 611 | 66 | 44 |
| b124 | 79 | 281 | 43 | 19 |
| b143 | 135 | 366 | 46 | 26 |
| badvoro | 1235 | 1616 | 53 | 32 |
| mode | 213 | 269 | 43 | 26 |
| ngk10_4 | 50 | 100 | 29 | 8 |
| NaN | 76 | 121 | 34 | 9 |
| dpd | 36 | 108 | 26 | 6 |
| root | 1054 | 1083 | 103 | 119 |
| rowe | 43 | 68 | 28 | 7 |
| size | 47 | 55 | 29 | 14 |
| unix | 41 | 49 | 32 | 8 |
| xx | 302 | 611 | 53 | 46 |

METHODS, SYSTEMS, AND PRODUCTS FOR GRAPHING DATA TO REDUCE OVERLAP

COPYRIGHT NOTIFICATION

A portion of the disclosure of this patent document and its attachments contain material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND

Exemplary embodiments generally relate to electrical computers and, more particularly, to graphing data.

Graphing is important in mathematics and in computer science. Graphs are often used to visually depict relationships between data. A graph joins or connects a set of objects (such as "vertices" or "nodes") with lines or edges. There may be many types of graphs, and graph theory has evolved as its own disciplinary study.

Graphing may also include labels and/or graphics. Graphical data may include labels or graphics. These labels and graphics help explain the graph data. Unfortunately, though, many times these labels and/or graphics may lead to "overlap." That is, the labels, graphics, and even nodes may overlap, thus causing the information associated with one node to block or occlude the information of other nodes. While there are many known techniques that reduce overlapping nodes, these known techniques may still distort the original shape of a graph.

SUMMARY

Exemplary embodiments provide methods, systems, and products for graphing data. Exemplary embodiments remove nodal overlap while still preserving an overall shape of an original layout. Exemplary embodiments may utilize a proximity graph of nodes from the original layout and iteratively move the nodes, particularly those that overlap, while keeping the relative positions between the nodes as close to those in the original layout as possible. Exemplary embodiments may only sparsely select node pairs from the original layout, thus efficiently processing even very large graphs.

Exemplary embodiments include a method for graphing data. A layout is retrieved that comprises locations for vertices. A proximity graph is generated using a Delauney triangulation. Nodal overlaps are removed.

More exemplary embodiments include a system for graphing data. Means are disclosed for retrieving a layout that comprises locations for vertices. Means is included for generating proximity graph using a Delauney triangulation. Nodal overlaps are removed.

Still more exemplary embodiments include a computer readable medium that stores instructions for performing a method of graphing data.

Other systems, methods, and/or computer program products according to the exemplary embodiments will be or become apparent to one with ordinary skill in the art upon review of the following drawings and detailed description. It is intended that all such additional systems, methods, and/or computer program products be included within this description, be within the scope of the claims, and be protected by the accompanying claims.

BRIEF DESCRIPTION OF THE SEVERAL VIEWS OF THE DRAWINGS

These and other features, aspects, and advantages of the exemplary embodiments are better understood when the following Detailed Description is read with reference to the accompanying drawings, wherein:

FIG. 3 illustrates an outline of an overlap removal algorithm, according to exemplary embodiments;

FIG. 4 is a table of processing times for various overlap removal algorithms, according to exemplary embodiments;

FIG. 5 is a table of dissimilarities for various overlap removal algorithms, according to exemplary embodiments;

FIG. 7 is another table of dissimilarities, according to exemplary embodiments;

FIG. 9 is another table of dissimilarities, according to exemplary embodiments;

FIG. 10 is a table of iterations, according to exemplary embodiments;

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
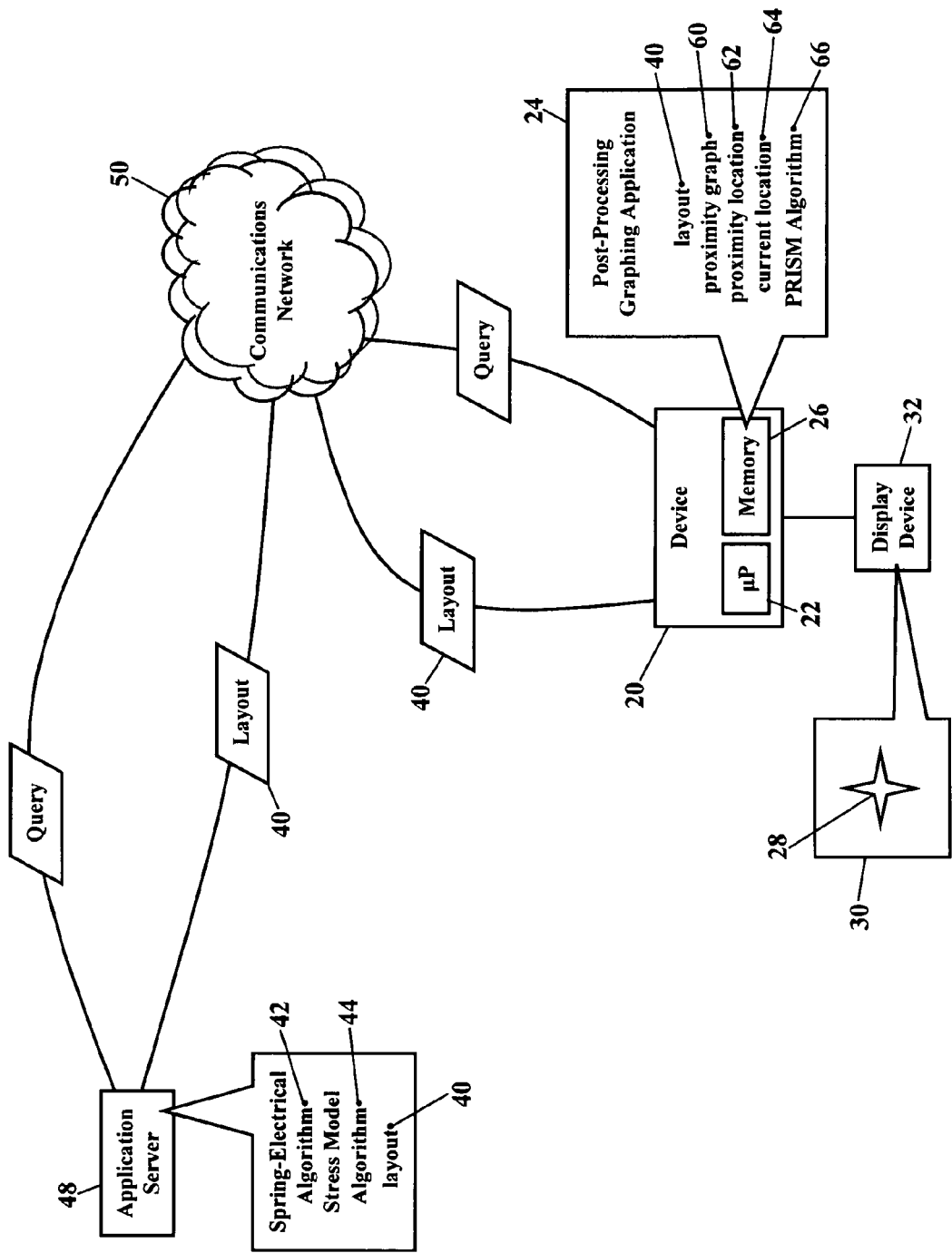
FIG. 1 is a simplified schematic illustrating an environment in which exemplary embodiments may be implemented.

FIG. 1 is a simplified schematic illustrating an environment in which exemplary embodiments may be implemented. A device 20 has a processor 22 (e.g., "µP"), application specific integrated circuit (ASIC), or other component that executes a post-processing graphing application 24 stored in a memory 26. The post-processing graphing application 24 may cause the processor 22 to produce a graph 28. The graph 28 may be incorporated into or produced within a graphical user interface 30. The graph 28 and the graphical user interface 30 are illustrated as being visually produced on a display device 32, yet the graph 28 and/or the graphical user interface 30 may also have audible features. Although the device 20 is generically shown, the device 20, as later paragraphs will explain, may be a server, workstation, or any processor-controlled device.

The post-processing graphing application 24 may accept a layout 40 as an input. The layout 40 may be produced from a spring-electrical algorithm 42 and/or from a stress model algorithm 44. FIG. 1 illustrates the layout 40 being retrieved from an application server 48. The application server 48 may execute the spring-electrical algorithm 42 and/or the stress model algorithm 44. The application server 48 then generates the layout 40. The device 20 may then query the application server 48 to retrieve the layout 40. The layout 40 communicates via a communications network 50 to the device 20. The post-processing graphing application 24 may then cause the processor 22 to store the layout 40 in the memory 26. The post-processing graphing application 24 may then accept the layout 40 as an input and post-process the layout 40. As later paragraphs will explain in more detail, exemplary embodiments may generate a proximity graph 60 that confines each vertex to a proximity location 62 about a current location 64 (as calculated from the layout 40). Exemplary embodiments may then iteratively resolve a PRISM algorithm 66 to remove nodal overlap, as the later paragraphs will explain.

The device 20 and the application server 48 are only simply illustrated. Because the architecture and operating principles of processor-controlled devices are well known, their hardware and software components are not further shown and described. If the reader desires more details, the reader is invited to consult the following sources: ANDREW TANENBAUM, COMPUTER NETWORKS (4th edition 2003); WILLIAM STALLINGS, COMPUTER ORGANIZATION AND ARCHITECTURE: DESIGNING FOR PERFORMANCE (7th Ed., 2005); and DAVID A. PATTERSON & JOHN L. HENNESSY, COMPUTER ORGANIZATION AND DESIGN: THE HARDWARE/SOFTWARE INTERFACE (3rd. Edition 2004).

Exemplary embodiments will now be explained in greater detail. The notation $$G = \{V, E\}$$

may denote an undirected graph, with V being the set of nodes or vertices and E being its edges. |V| and |E| denote the number of vertices and edges, respectively. The notation $x_i$ denotes the current coordinates of vertex i in two or three dimensional Euclidean space. A graph drawing strives to find $x_i$ for all $i \in V$ so that the resulting drawing provides a good visual representation of the information in the graph. Two popular methods, the spring electrical algorithm 42 and the stress model algorithm 44, both convert the problem of finding an optimal layout 40 to that of finding a minimal energy configuration of a physical system. The following paragraphs will describe the stress model algorithm 44 in more detail for the purpose of node overlap removal.

The stress model algorithm 44 assumes that there are springs connecting all nodes of the graph. The stress model algorithm 44 may also assume that the ideal spring length is equal to a graph theoretical distance between nodes. The energy of this spring system is $$\sum_{i \neq j} w_{ij} (\|x_i - x_j\| - d_{ij})^2,$$

(Equation #1) where $d_{ij}$ is the graph theoretical distance between vertices i and j, and where $\omega_{ij}$ is a weight factor (which is typically $1/d_{ij}^2$).

The layout that minimizes the above stress energy is an optimal layout of the graph. There are several ways to find a solution of the minimization problem. An iterative approach may be employed. Starting from a random layout, the total spring force on each vertex is calculated, and the vertex is moved along the direction of the force for a certain step length. This iterative process is repeated, with the step length decreasing for every iteration, until the layout 40 stabilizes. Alternatively, a stress majorization technique may be employed, where the energy cost function (Equation 1) is bounded by a series of quadratic functions from above, and the process of finding an optimum becomes that of solving a series of linear systems.

In the stress model algorithm 44, the graph theoretical distance between all pairs of vertices may be calculated, leading to quadratic complexity in the number of vertices. There have been known attempts to simplify the stress function by considering only a sparse portion of the graph. Experience with real-life graphs, though, has shown that these known techniques may fail to yield good layouts. Therefore, algorithms based on the spring-electrical model employing a multilevel approach and an efficient approximation scheme for long range repulsive forces may still be the most efficient choices to lay out large graphs without consideration of the node size.

The outcome of an overlap removal algorithm may be measured in two aspects. The first aspect is the overall bounding box area. That is, minimize the area taken by the drawing after overlap removal. The second aspect is the change in relative positions. Here it is desired that the shape of the new drawing be as close to the original as possible. It is this second aspect that is hard to quantify.

When orthogonal ordering is preserved, comparison is reduced to measuring the amount of displacement of the vertices in the new layout from those of the original graph. This measurement does not take into account possible shifts, scalings, or rotations, nor the importance of maintaining the relative position among vertices.

Conventionally, there is no definitive way to measure similarity of two layouts of the same graph. Exemplary embodiments, then, may adopt two approaches. The first approach is based on measuring changes in lengths of edges. The second approach, which is a modification of the metric of Dwyer et al., is based on measuring the displacement of vertices, after discounting shift, scaling and rotation (see T. Dwyer, K. Marriott, & P. J. Stuckey, *Fast Node Overlap Removal*, in PROCEEDINGS OF 13$^{TH}$ INT'L SYMPOSIUM ON GRAPH DRAWING (GD '05), vol. 3843 of *Lecture Notes in Computer Science*, 153-164, Springer (2006)).

One way to measure the similarity of two layouts is to measure the distance between all pairs of vertices in the original and the new layout. If the two layouts are similar, then these distances should match, subject to scaling. This is known as Frobenius metric in the sensor localization problem. However, calculating all pairwise distances is expensive for large graphs, both in CPU time and in the amount of memory. Exemplary embodiments, then, may, instead, form a Delaunay triangulation (or "DT") of the original graph, then measure the distance between vertices along the edges of the triangulation for the original and new layouts. If $x^0$ and $x$ denote the original layout and the new layout, and $E_p$ is the set of edges in the triangulation, exemplary embodiments may calculate the ratio of the edge length $$r_{ij} = \frac{\|x_i - x_j\|}{\|x_i^0 - x_j^0\|}, \{i, j\} \in E_P,$$

then define a measure of the dissimilarity as the normalized standard deviation $$\sigma_{dist}(x^0, x) = \frac{\sqrt{\frac{\sum_{\{i,j\} \in E_P}(r_{ij} - \bar{r})^2}{|E_P|}}}{\bar{r}},$$

where $$\bar{r} = \frac{1}{|E_P|} \sum_{\{i,j\} \in E_P} r_{ij}$$

is the mean ratio.

The edge length ratio is measured along edges of the proximity graph, rather than along edges of the original graph. If the original graph is not rigid, then even if two layouts of the same graph have the same edge lengths, the two layouts could be completely different. For example, consider the graph of a square, and a new layout of the same graph in the shape of a non-square rhombus. These two layouts may have exactly the same edge lengths, but the two graphs are clearly different. The rigidity of the triangulation avoids this problem.

Notice that $\sigma_{dist}(x^0, x)$ is not symmetric with regard to which layout comes first. Furthermore, in theory, this non-symmetric version could class a layout and a foldover of it (e.g., a square grid with one half folded over the other) as the same. Exemplary embodiments may thus symmetrize it by defining the dissimilarity between layouts $x^0$ and $x$ as $(\sigma_{dist}(x^0, x) + \sigma_{dist}(x, x^0))/2$. This also resolves the foldover problem. The symmetric version may be more appropriate if two unrelated layouts are compared. Because, however, a comparison is being performed between a layout derived from an existing layout, the asymmetric version is adequate.

An alternative measure of similarity is to calculate the displacement of vertices of the new layout from the original layout. Clearly a new layout derived from a shift, scaling and rotation may be considered identical. Therefore, the straight displacement calculation may be modified by discounting the aforementioned transformations. This is achieved by finding the optimal scaling, shift and rotation that minimize the displacement. The optimal displacement is then a measure of dissimilarity.

The scaling and rotation are denoted by scalars $r$ and $\theta$. The translation is denoted as $p \in R$. The displacement dissimilarity is defined as $$\sigma_{dist}(x^0, x) = \min p \in R^2, \theta, r \in R \sum_{i \in V} \|rTx_i + p - x_i^0\|^2,$$

where $$T = \begin{pmatrix} \cos(\theta) & \sin(\theta) \\ -\sin(\theta) & \cos(\theta) \end{pmatrix}$$

is the rotation matrix. This is a known problem in the procrustes analysis and the solution (the "procrustes statistic") is known as $$\sigma_{dist}(x^0,x) = Tr(X^0 X^{0^T}) - (Tr((X^T X^0 X^{0^T} X)^{1/2})^2 Tr(X^T X),$$

where $X$ is a matrix with columns $x_i - \bar{x}$, $X^0$ is a matrix with columns $x_i^0 - \bar{x}^0$, and where $\bar{x}$ and $\bar{x}^0$ are the centers of gravity of the new and original layout. The above analysis does not consider shearing, as a layout derived from shearing of the original should not be considered identical to the latter.

The quality of an overlap removal algorithm is a combination of how similar the new layout is to the original, and how small an area it occupies. The simplest overlap removal algorithm is that of scaling the layout until all overlaps are removed. This has a dissimilarity of zero (0), but this simplest overlap removal algorithm may occupy a very large area. An alternative extreme is to pack the nodes as close to each other as possible while ignoring the original layout. This alternative extreme will have the smallest area, but a large dissimilarity. Exemplary embodiments thus present a compromise between these two extremes.

Exemplary embodiments remove overlaps while preserving the shape of the initial layout. Exemplary embodiments maintain proximity relations amongst the nodes. Exemplary embodiments may first set up a rigid scaffolding structure so that while vertices can move around, their relative positions are maintained. This scaffolding is constructed using the proximity graph 60.

The proximity graph 60 is a graph derived from a set of points in space. Points that are neighbors to each other in the space may form an edge in the proximity graph 60. There are many ways to create the proximity graph 60. Exemplary embodiments may, for example, utilize the Delaunay triangulation. Two points are neighbors if, and only if, there exists a sphere passing through these two points, and no other points lie in the interior of this sphere.

Once the Delaunay triangulation is formed, exemplary embodiments may check every edge in the Delaunay triangulation. Exemplary embodiments may thus determine if there is any node that overlaps along that edge. Let $w_i$ and $h_i$ denote the half width and height of the node i, and let $x_i^0(1)$ and $x_i^0(2)$ denote current X and Y coordinates of this node. If i and j form an edge in the Delaunay triangulation, the overlap factor $t_{ij}$ of these two nodes may be calculated from $$t_{ij} = \max\left(\min\left(\frac{w_i + w_j}{|x_i^0(1) - x_j^0(1)|}, \frac{h_i + h_j}{|x_i^0(2) - x_j^0(2)|}\right), 1\right).$$

For nodes that do not overlap, then $t_{ij}=1$. For nodes that do overlap, such overlaps can be removed if the edge is expanded by this overlap factor. Therefore, exemplary embodiments may generate a layout such that an edge in the proximity graph 60 has the ideal edge length close to $$t_{ij}\|x_i^0-x_j^0\|.$$

In other words, exemplary embodiments may minimize the following stress function $$\sum_{(i,j)\in E_P} w_{ij}(\|x_i - x_j\| - d_{ij})^2$$

This equation will hereinafter be termed the proximity stress model algorithm 44. Here the term $$d_{ij}=s_{ij}\|x_i^0-x_j^0\|$$

is the ideal distance for the edge $\{i,j\}$, the term $s_{ij}$ is a scaling factor related to the overlap factor $t_{ij}$, the term $\omega_{ij}=1/\|d_{ij}\|^2$ is a scaling factor, and $E_p$ is the set of edges of the proximity graph 60.

A more general expression may be used. The above paragraph represents nodes as rectangles. Exemplary embodiments, however, may utilize a more general concept of $$t_{ij}=\max(f_{ij},1)_{ij},$$

where $f_{ij}$ may be any computed expansion such that if the distance between $x_i$ and $x_j$ is increased by the factor $f_{ij}$, the nodes may no longer overlap. Thus, instead of rectangles, exemplary embodiments may use circles, which may make a simpler computation of $f_{ij}$. On the other hand, exemplary embodiments may allow the nodes to be represented as arbitrary polygons. The resulting computation of $f_{ij}$ would be more complex, but the final layout would be more tightly packed.

The Delaunay triangulation is a planar graph. The Delaunay triangulation can therefore have no more than $(3|V|-3)$ edges. Hence the proximity stress model algorithm 44 may have no more than $(3|V|-3)$ terms. Furthermore, because the Delaunay triangulation is rigid, the proximity stress model algorithm 44 provides a good scaffolding that constrains the relative position of the vertices and helps to preserve the global structure of the original layout 40. Exemplary embodiments, though, may decline to remove overlaps in one iteration by using the above proximity stress model algorithm 44 with $s_{ij}$ equal to $t_{ij}$. Imagine the situation of a regular mesh graph, with one node i of particularly large size that significantly overlaps its nearby nodes, but the other nodes do not overlap with each other. Suppose nodes i and j form an edge in the proximity graph 60, and nodes i and j overlap. If one tries to make the length of the edge equal to $$t_{ij}\|x_i^0-x_j^0\|,$$

then one finds that $t_{ij}$ is a number much larger than one (1), and the optimum solution to the proximity stress model algorithm 44 is to keep all the other vertices at or close to their current positions, but move the large node i outside of the mesh, at a position that does not cause overlap. This solution, however, may not be desirable, because it destroys the original layout 40. Therefore, exemplary embodiments may dampen the overlap factor $t_{ij}$ by setting $$s_{ij}=\min(t_{ij},s_{max})$$

and try to remove overlap a little at a time. Here $s_{max}>1$ is a number limiting the amount of overlap permitted to be removed in one iteration. Observations have shown that $s_{max}=1.5$ works well.

After minimizing the proximity stress model algorithm 44, exemplary embodiments generate a different layout that may still have some nodal overlaps. Exemplary embodiments may then regenerate the proximity graph 60 using the Delaunay triangulation and calculate the overlap factor $t_{ij}$ along the edges of the proximity graph 60, and then again minimize the proximity stress model algorithm 44. This analysis forms an iterative process that ends when there are no more overlaps along the edges of the proximity graph 60.

Figure 2A:
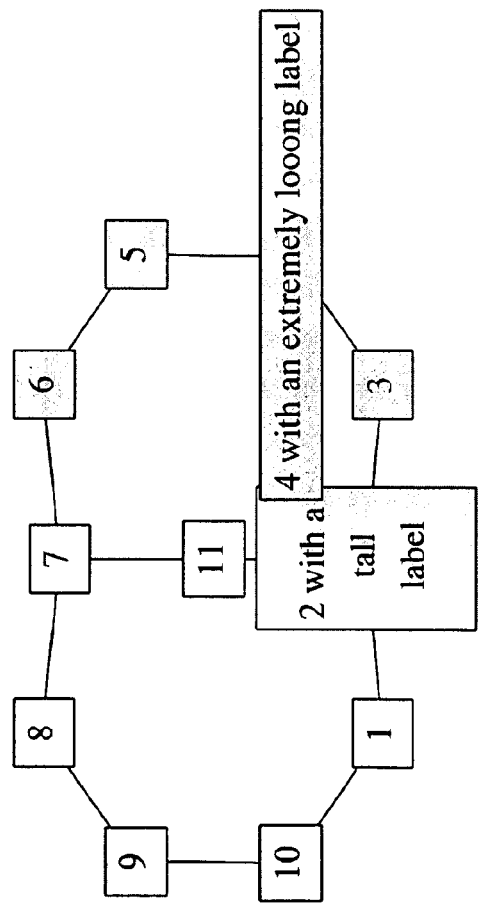
FIG. 2A is a schematic illustrating nodal overlap.
Figure 2B:
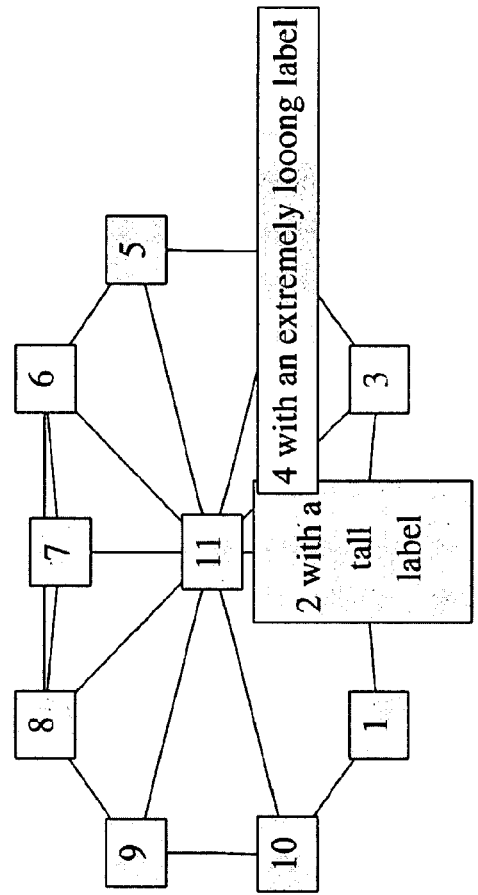
FIG. 2B is a schematic illustrating a type of nodal overlap that requires application of an overlap removal algorithm, which uses a scan-line algorithm to check for any overlaps which are not found using the edges of the proximity graph, according to exemplary embodiments.
Figure 6A:
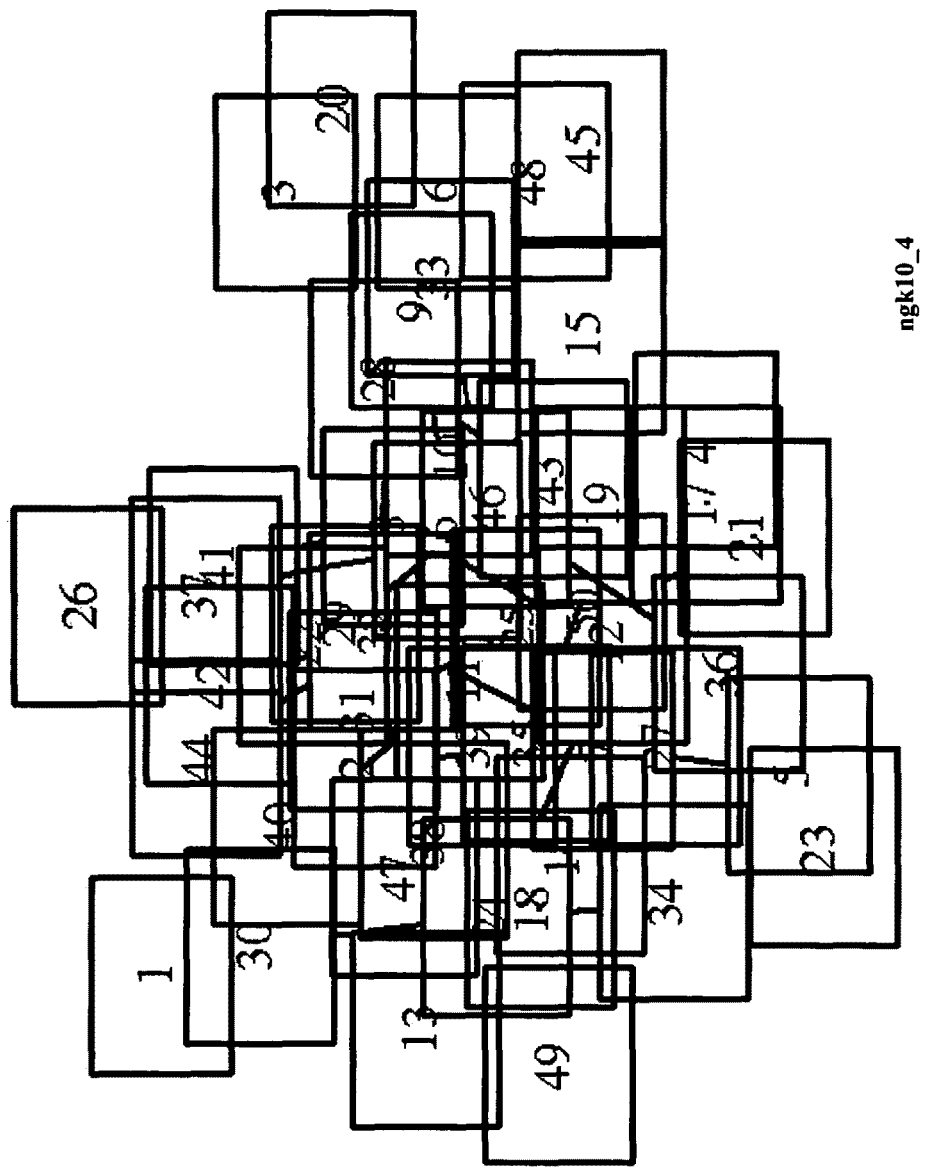
FIG. 6 is a schematic illustrating various graphical results of overlap removal algorithms, according to exemplary embodiments.
Figure 6B:
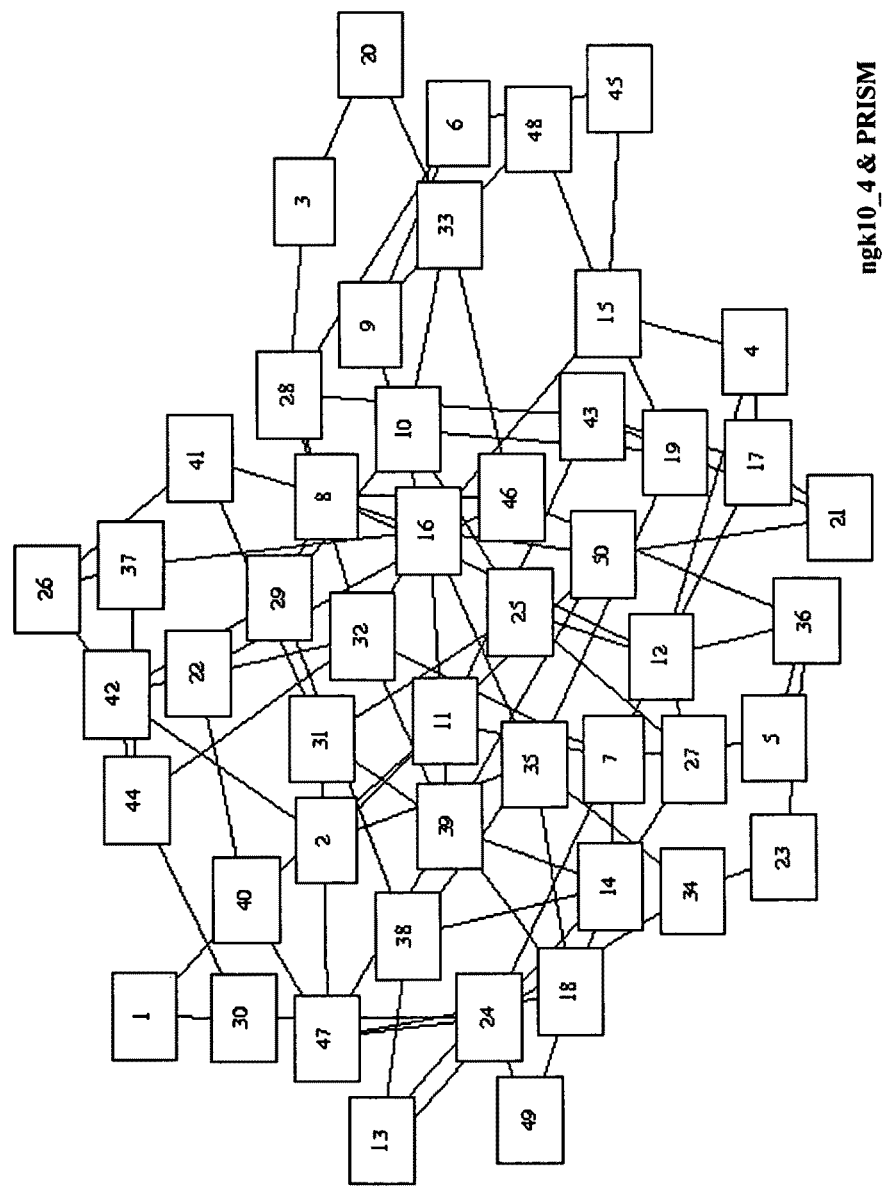
Figure 6C:
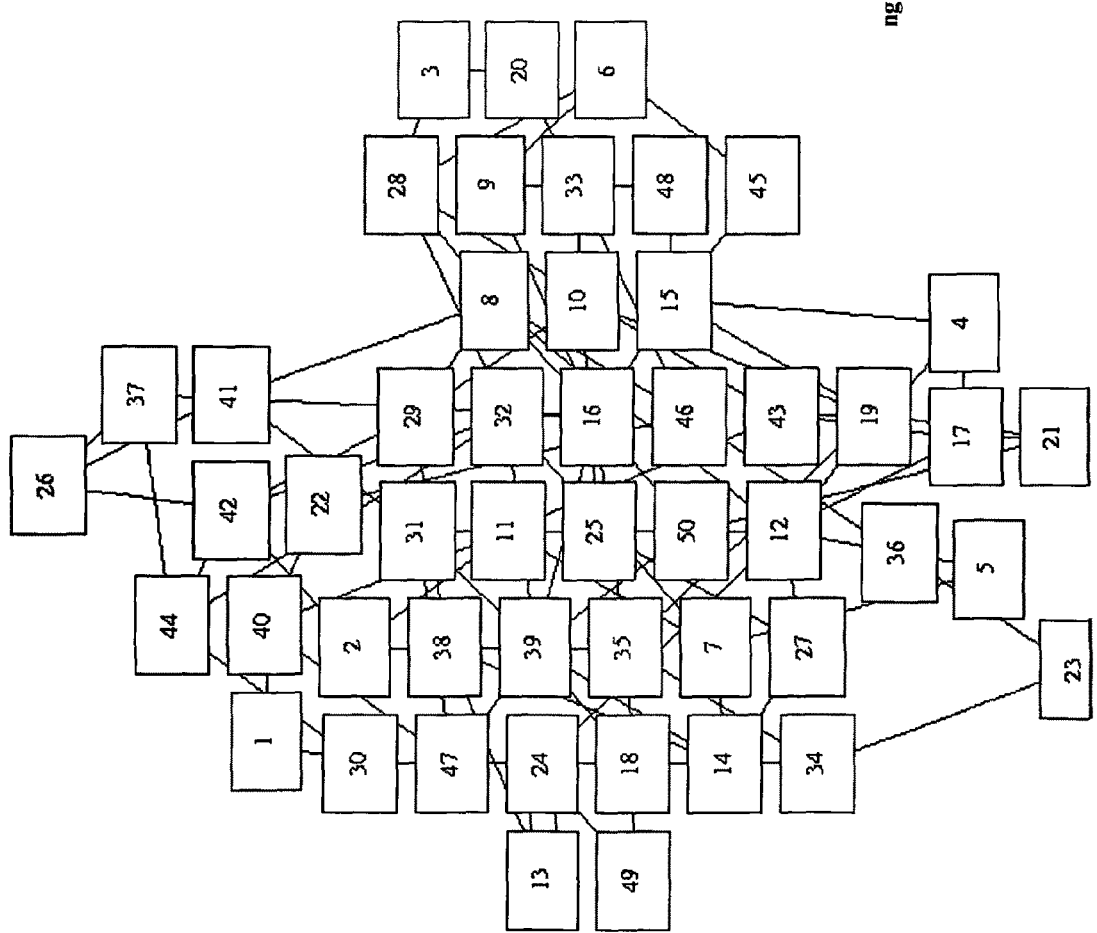
Figure 6D:
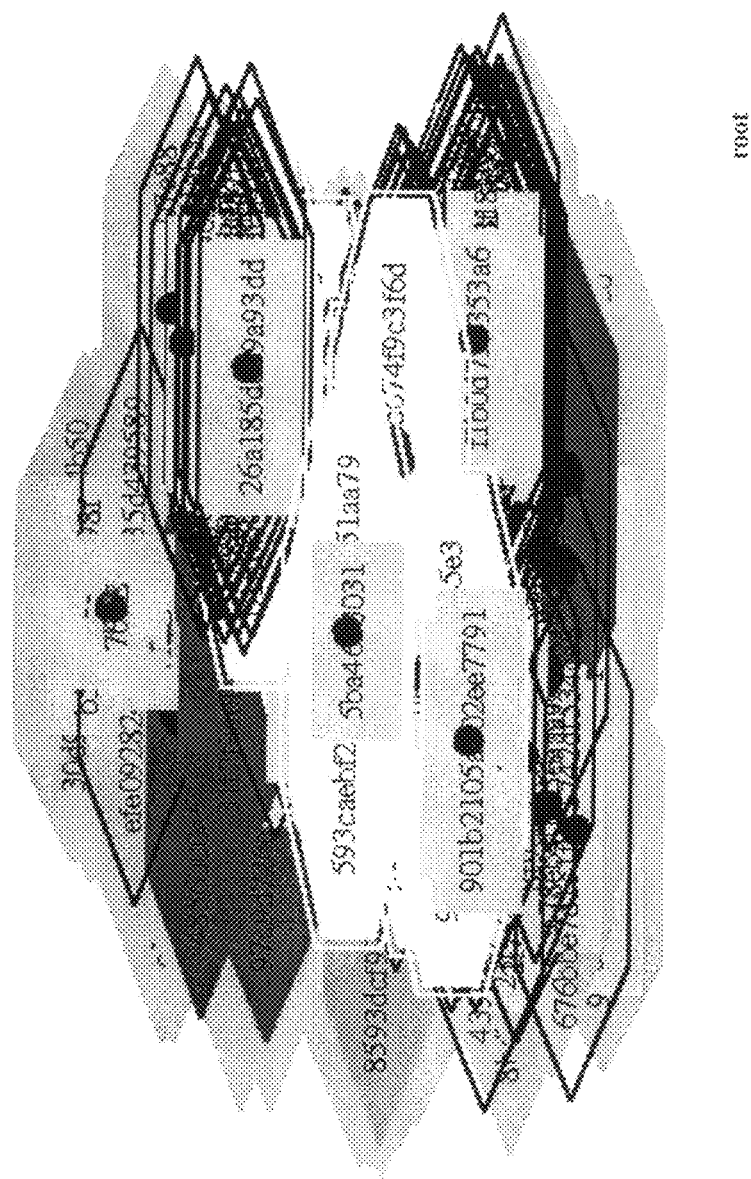
Figure 6E:
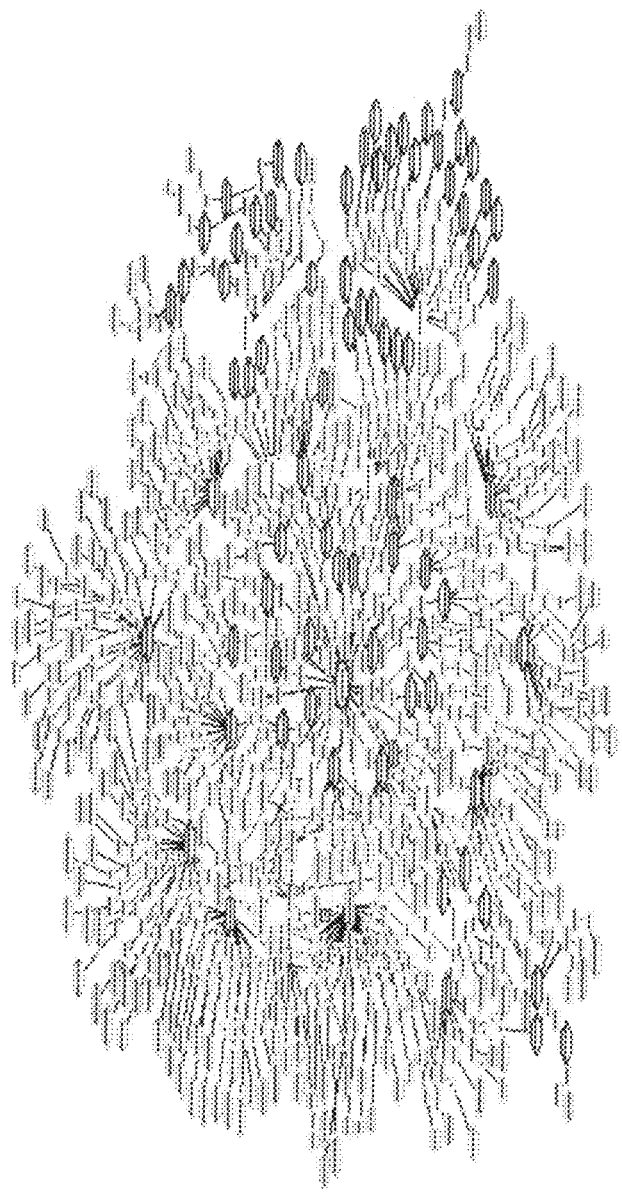
Figure 8A:
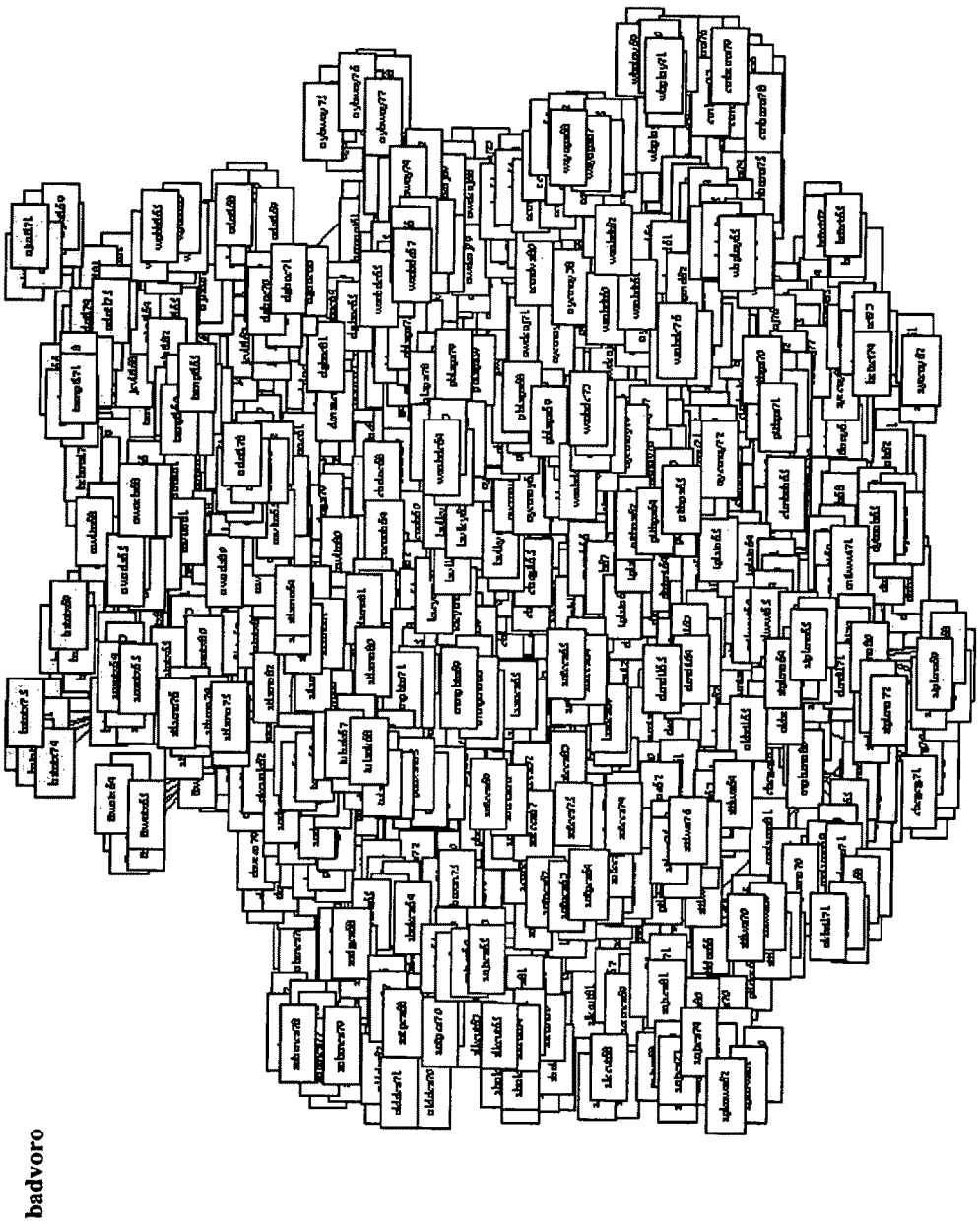
FIG. 8 is a schematic illustrating more graphical results, according to exemplary embodiments.
Figure 8B:
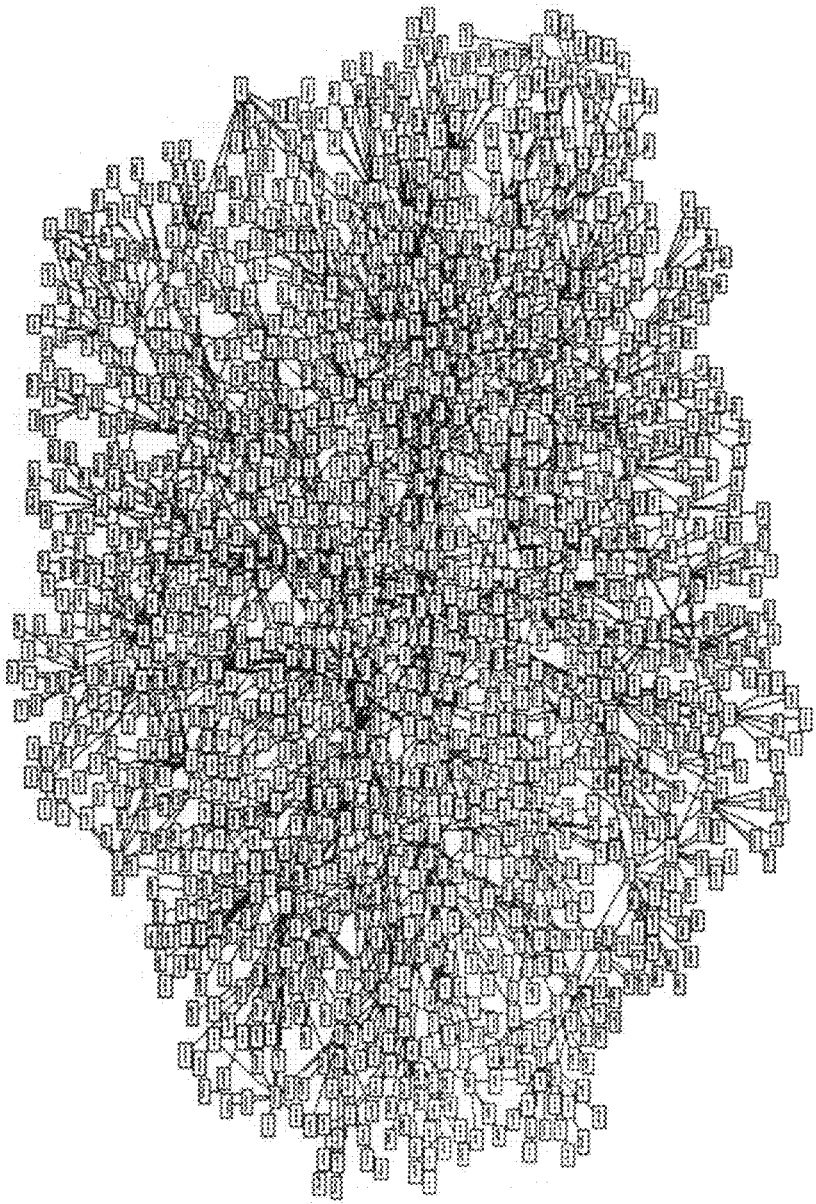
Figure 8C:
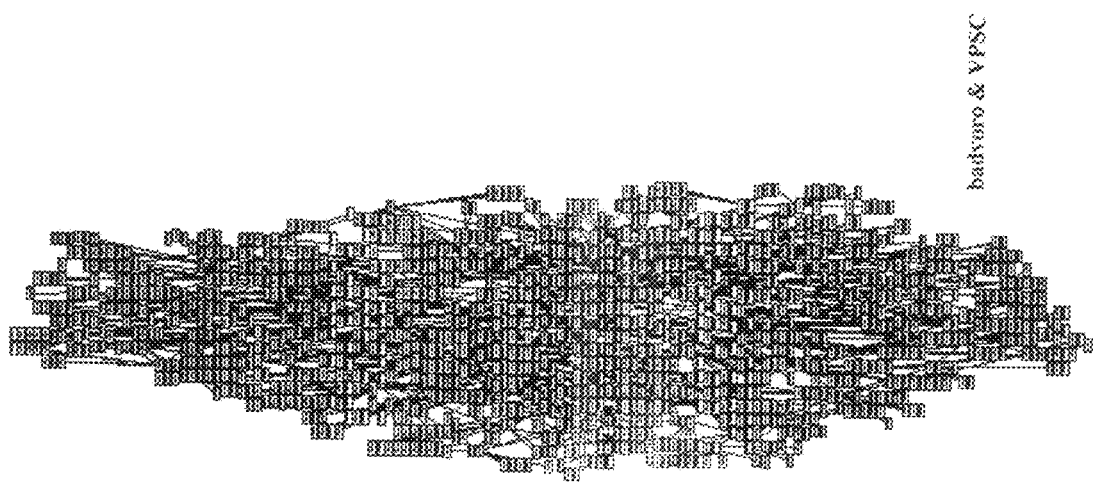
Figure 8E:
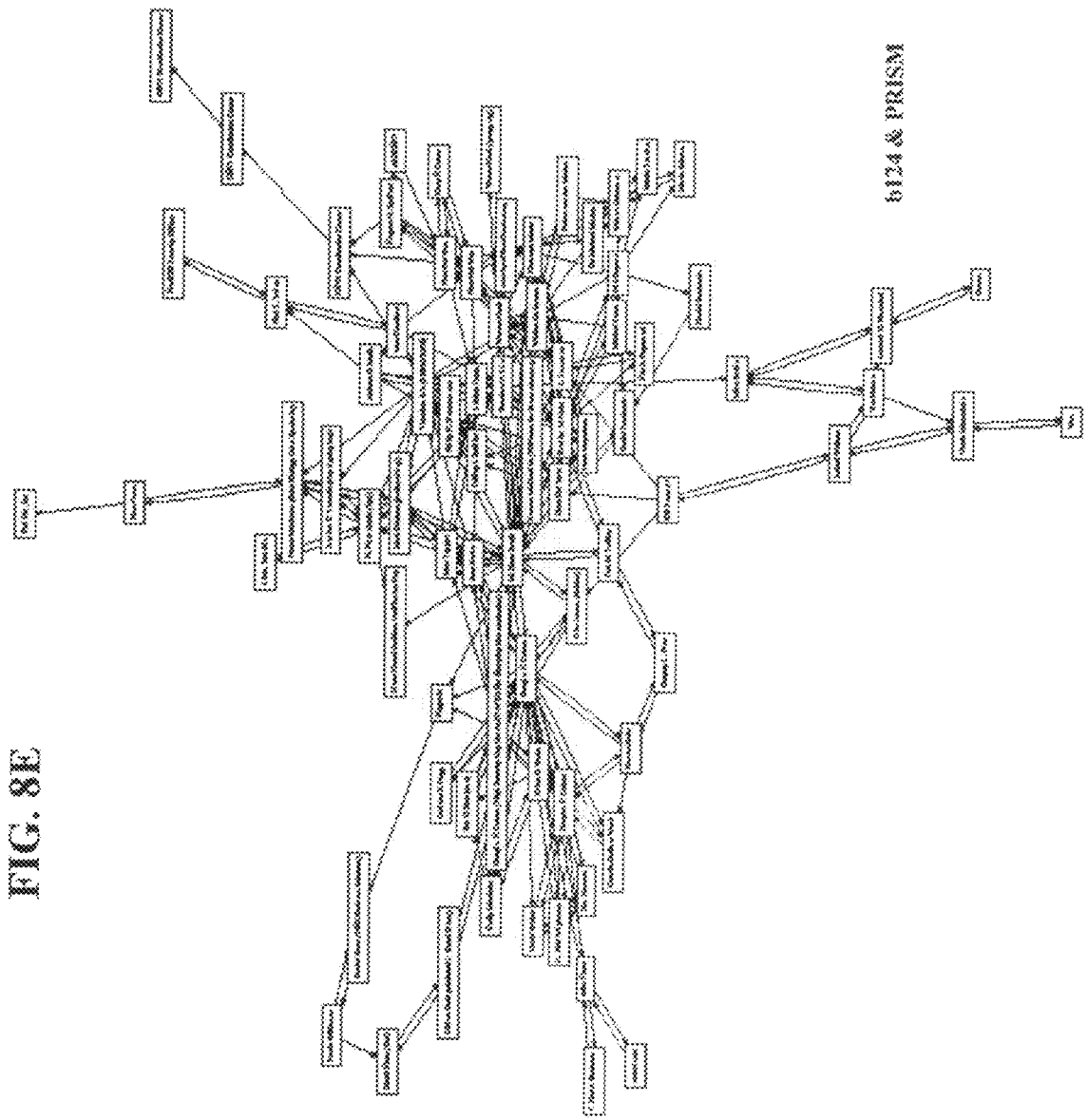
Figure 8F:
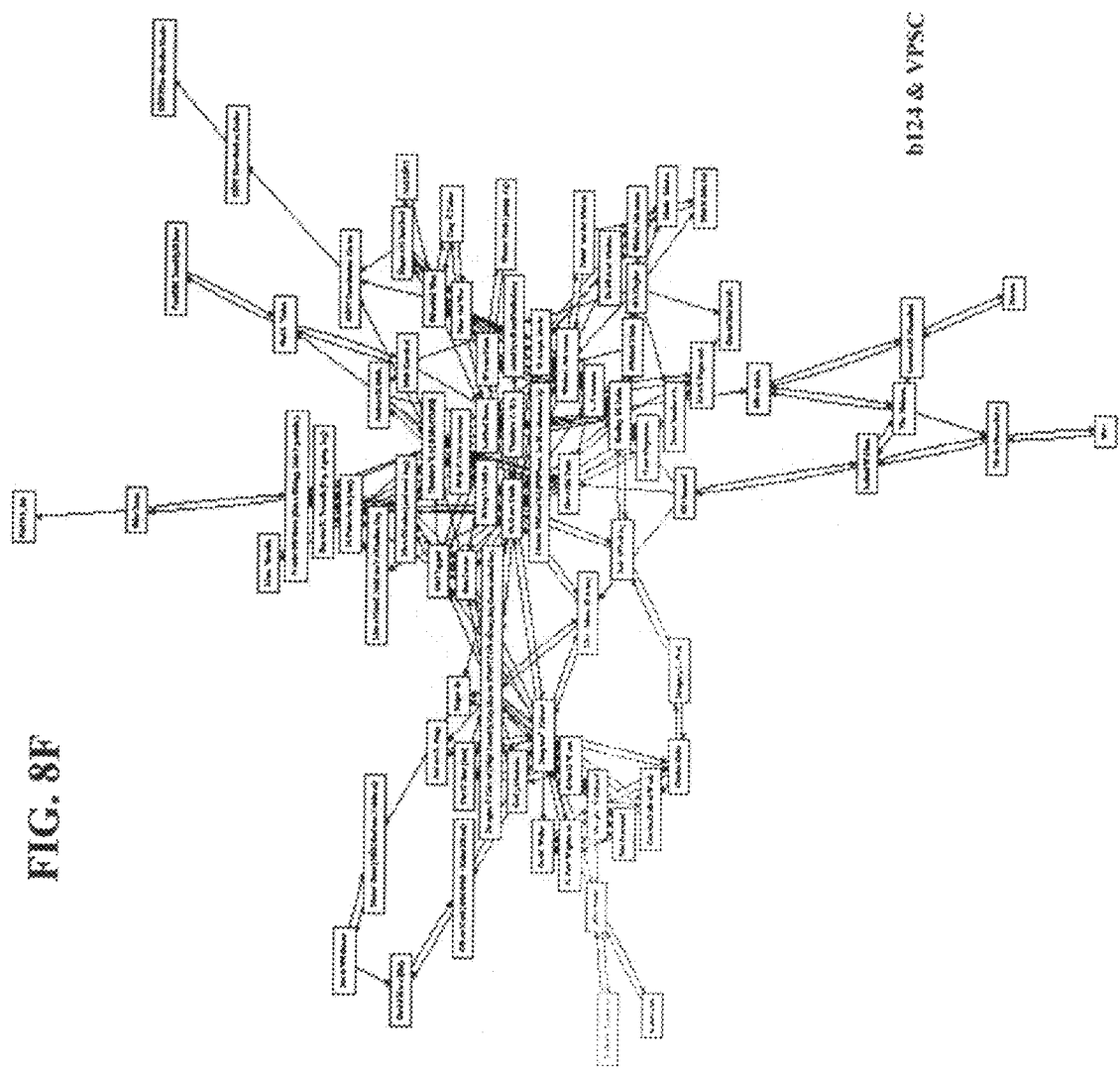

FIGS. 2A and 2B are schematics illustrating exemplary embodiments. For many graphs, the above iterative process yields a drawing that is free of nodal overlaps. For some graphs, however, especially those with nodes having extreme aspect ratios, node overlaps may still occur. Such overlaps occur for pairs of nodes that are not near each other, and thus do not constitute edges of the proximity graph 60. FIG. 2A illustrates a drawing of a graph after iteratively minimizing the proximity stress model algorithm 44, so that no more node overlap is found along the edges of the Delaunay triangulation. Clearly, though, node 2 and node 4 still overlap. When the Delaunay triangulation is performed, FIG. 2B illustrates that nodes 2 and 4 are not neighbors in the proximity graph 60, which explains the overlap.

FIG. 3, then, is a schematic illustrating an algorithm for removing nodal overlap, according to exemplary embodiments. Once the above iterative process has converged (so that no more overlaps are detected over the Delaunay triangulation edges), exemplary embodiments may apply a known scan-line algorithm to find all overlaps. Exemplary embodiments may then augment the proximity graph 60 with additional edges, where each edge consists of a pair of nodes that overlap. Exemplary embodiments may then re-solve the proximity stress model algorithm 44. This process is repeated until the scan-line algorithm determines no more nodal overlaps occur. The algorithm illustrated in FIG. 3 is hereinafter called "PRISM" (for "PRoxImity Stress Model algorithm") (also illustrated as reference numeral 66 in FIG. 1).

Some of the main computational steps in the PRISM algorithm of FIG. 3 are now discussed. The Delaunay triangulation may be computed in time as $$O(|V|\log(|V|))$$

where exemplary embodiments used the mesh generator "Triangle" for triangulation (see Jonathan Richard Shewchuk, *Triangle: Engineering a 2D Quality Mesh Generator and Delaunay Triangulator,* in APPLIED COMPUTATIONAL GEOMETRY: TOWARDS GEOMETRIC ENGINEERING' (Ming C. Lin and Dinesh Manocha, editors), volume 1148 of Lecture Notes in Computer Science, pages 203-222, Springer-Verlag, Berlin, May 1996). The scan-line algorithm can be implemented to find all the overlaps in $$O(|V|(\log|V|+1))$$

time, where l denotes the number of overlaps. Because the scan-line algorithm may only be applied after no more node overlaps are found along edges of the proximity graph 60, l is usually a very small number, hence this step can be considered as taking time $$O(|V|\log|V|).$$

The proximity stress model algorithm 44, like the spring electrical model 42, may be solved using the stress majorization technique, which is known in the art to be a robust process for finding the minimum of the spring electrical model. The technique works by bounding the proximity stress model algorithm 44 with a series of quadratic functions from above, and the process of finding an optimum becomes that of finding the optimum of the series of quadratic functions, which involves solving linear systems with a weighted Laplacian of the proximity graph 60. Exemplary embodiments may solve each linear system using a preconditioned conjugate gradient algorithm. Because we use the Delaunay triangulation as the proximity graph 60 and it has no more than $(3|V|-3)$ edges, each iteration of the conjugate gradient algorithm takes a time of $O(|V|)$. Overall, therefore, the PRISM algorithm illustrated in FIG. 3 takes $$O(t(mk|V|+|V|\log|V|))$$

time, where t is the total number of iterations in the two main loops of the algorithm, where m is the average number of stress majorization iterations, and where k is the average number of iterations for the conjugate gradient algorithm.

Observations have shown that the majority of CPU processing time is spent in repeatedly solving the linear systems (which takes a total time of $O(tmk|V|)$). Exemplary embodiments may thus terminate the conjugate gradient algorithm if the relative 2-norm residual for the linear system involved in the stress majorization process is less than (0.01). A tighter tolerance is not necessary because the solution of each linear system constitutes an intermediate step of the stress majorization. Furthermore, solution of the proximity stress model algorithm 44 is an intermediate step itself in the PRISM algorithm illustrated in FIG. 3, so exemplary embodiments may not need to solve proximity stress model algorithm 44 accurately either. Hence, exemplary embodiments may set a limit of $m_{max}$ iterations. Experimentation shows that a smaller value of $m_{max}$ gives a faster algorithm, and that, in terms of quality, a smaller value of $m_{max}$ is often just as good as, if not better than, a larger value of $m_{max}$. Therefore, exemplary embodiments may set $m_{max}=1$.

To evaluate the PRISM algorithm (illustrated as reference numeral 66 in FIG. 3) and other overlap removal algorithms, exemplary embodiments may apply each as a post-processing step to a selection of graphs from the GRAPHVIZ® test suite. The baseline algorithm is the known Scalable Force Directed Placement ("SFDP") algorithm, a multilevel, spring-electrical algorithm. Using the layout of the Scalable Force Directed Placement algorithm, one of the overlap removal algorithms may be applied to generate a new layout that has no node overlaps. The original layout and the new layout may then be compared in terms of dissimilarity and area.

FIG. 4 is a table of processing times for the tested overlap removal algorithms, according to exemplary embodiments. Fourteen (14) test graphs are listed, along with the number of vertices and edges. The table lists the CPU processing times (in seconds) for the PRISM algorithm (illustrated as reference numeral 66) and for three other known overlap removal algorithms. All the tests were performed on a four processor, 3.2 GHz INTEL® XEON® processor with 8.16 GB of memory and running LINUX®. The graphs were selected randomly with the criteria that a graph chosen should be connected, and is of relatively large size. The results compare the PRISM algorithm with an implementation in GRAPHVIZ® of the known solve_VPSC algorithm (hereinafter denoted as "VPSC"), as well as "VORO," the known Voronoi cluster busting algorithm. The final algorithm is the known "ODNLS" algorithm of Li et al., which relies on varied edge lengths in a spring embedder (see W. Li, P. Eades, & N. Nikolov, *Using Spring Algorithms to Remove Node Overlapping*, PROC. ASIA-PACIFIC SYMP. ON INFORMATION VISUALISATION, 131-140 (2005)).

The initial layout by Scalable Force Directed Placement is scaled so that the average edge length is one (1) inch. From FIG. 4 one sees that the PRISM algorithm 66 is usually faster, particularly for large graphs on which it scales much better. The other algorithms are slow for large graphs, with VORO the slowest.

FIG. 5 is a table of dissimilarities for the tested overlap removal algorithms, according to exemplary embodiments. FIG. 5 compares the dissimilarities and drawing area of the four overlap removal algorithms. Results shown are $\sigma_{dist}$, $\sigma_{disp}$, and area. The area is measured with a unit of $10^6$ square points. Initially the layout is scaled to an average length of one (1) inch. The smaller the dissimilarities and the drawing area, the better the results. The ODNLS algorithm performs best in terms of smaller dissimilarity, followed by PRISM, VPSC and VORO. In terms of area, PRISM and VPSC are pretty close, and both are better than ODNLS and VORO, which can give extremely large drawings. Indeed, in terms of area, scaling outperformed ODNLS and VORO in twenty to thirty percent (20%-30%) of the examples.

FIG. 6 is a schematic illustrating the graphical results of the tested overlap removal algorithms, according to exemplary embodiments. Comparing PRISM with VPSC, the table in FIG. 5 illustrates that PRISM gives smaller dissimilarities, most of the time. The two dissimilarity measures, $\sigma_{dist}$ and $\sigma_{disp}$, are generally correlated, except for graphs ngk10_4 and root. Based on $\sigma_{dist}$, VPSC is better for these two graphs, while based on $\sigma_{disp}$, PRISM is better. The first row of graphs in FIG. 6 illustrates the original layout of ngk10_4, as well as the result after applying PRISM and VPSC. Through visual inspection, one can see that PRISM preserved the proximity relations of the original layout well. VPSC packed the labels more tightly, but VPSC tends to line up vertices horizontally and vertically, and also produces a layout with aspect ratio quite different from the original graph. It seems that $\sigma_{dist}$ is not as sensitive in detecting differences in aspect ratio. This is evident in drawings of the root graph (e.g., the second row of FIG. 6). VPSC clearly produced a drawing that is overly stretched in the vertical direction, but its $\sigma_{dist}$ is surprisingly smaller. Consequently, one must conclude that $\sigma_{dist}$ may be a better dissimilarity measure.

The fact that VPSC can produce very tall and thin, or very short and wide, layouts is not surprising, and has been observed often in practice. VPSC works in the vertical and horizontal directions alternatively, each time trying to remove overlaps while minimizing displacement. As a result, when starting from a layout with severe node overlaps, VPSC may move vertices significantly along one direction to resolve the overlaps, creating drawings with extreme aspect ratios. In fact, for nine (9) out of the fourteen (14) test graphs, VPSC produces layouts with extreme aspect ratios. The PRISM algorithm of FIG. 3 does not suffer from this problem.

FIG. 7 is another table of dissimilarities, according to exemplary embodiments. When starting from a layout that is scaled sufficiently so that relative fewer nodes overlap, VPSC's performance can be improved. FIG. 7, then, compares the four (4) overlap removal algorithms, starting from layouts that are scaled to give an average edge length that equals four (4) times the average node size. Here the size of a node is calculated as the average of its width and height.

FIG. 8 is a schematic illustrating graphical results, according to exemplary embodiments. FIG. 8 illustrates a comparison of the PRISM and VPSC algorithms on two graphs. The original layouts were scaled to have an average edge length that equals four (4) times the label size. From the table of FIG. 7 one can see that in terms of dissimilarity, PRISM and VPSC are now similar, closer to the better performing ODNLS. In terms of drawing area, PRISM is better than VPSC, with VORO and ODNLS much larger. When visually inspected, VPSC again suffers from extreme aspect ratio issue on at least five (5) out of the fourteen (14) graphs (e.g., b100, b143, badvoro, mode, and root). FIG. 8 shows the layout of badvoro (first row), on which VPSC performed badly based on the two similarity measures. FIG. 8 also shows the b124 graph (second row) on which PRISM is rated worse than VPSC based on the same measures. On badvoro one clearly sees that VPSC performed badly, as the similarity measures suggest. On the other hand, if b124 is inspected, VPSC perhaps performed better than PRISM, but not as clearly as the similarity measures suggest. Overall, visual inspection of the drawings of these fourteen (14) graphs, as well as drawings for graphs in the complete GRAPHVIZ® test suite (a total of 204 graphs in March of 2008), shows that PRISM performs very well, and is overall better and faster than VPSC and VORO. The ODNLS algorithm preserves similarity somewhat better than PRISM, but at much higher costs in term of speed and area.

FIG. 9 is another table of dissimilarities, according to exemplary embodiments. The table of FIG. 9 compares the dissimilarities and area of overlap removal algorithms. Results shown are $\sigma_{dist}$, $\sigma_{disp}$, and area. The area is measured with a unit of $10^6$ square points. Initially the layout is scaled to an average length that equals four (4) times the label size. Considering a larger collection of graphs, the table of FIG. 9 compares PRISM with VPSC, VORO and ODNLS on the ROME® test suite of graphs. This suite has a total of 11,534 graphs of relatively small size. Due to space limitation, FIG. 9 only gives the similarity measure $\sigma_{disp}$ and the area, and the results are averaged over graphs of similar sizes. Again, PRISM achieves the best compromise between being close to the original drawing, and having a smaller drawing area.

FIG. 10 is a table of iterations, according to exemplary embodiments. This table lists the number of iterations taken in the two main loops in the PRISM algorithm of FIG. 3. A denotes that initially the layout is scaled to an average edge length of one (1) inch, while B denotes that initially the layout is scaled to an average edge length that equals four (4) times the average label size. Note that while there is no theoretical result guaranteeing that the PRISM algorithm converges to an overlap free layout in a finite number of iterations, in practice, out of thousands of graphs tested (some as large as tens of thousands of vertices), PRISM always converges within a few hundred total number of iterations in the two main loops in the PRISM algorithm of FIG. 3. The table of FIG. 10 gives the number of iterations taken for the fourteen (14) test cases in the tables of FIGS. 6 and 7. As FIG. 10 illustrates, for these graphs, the maximum number of iterations is 122.

Figure 11:
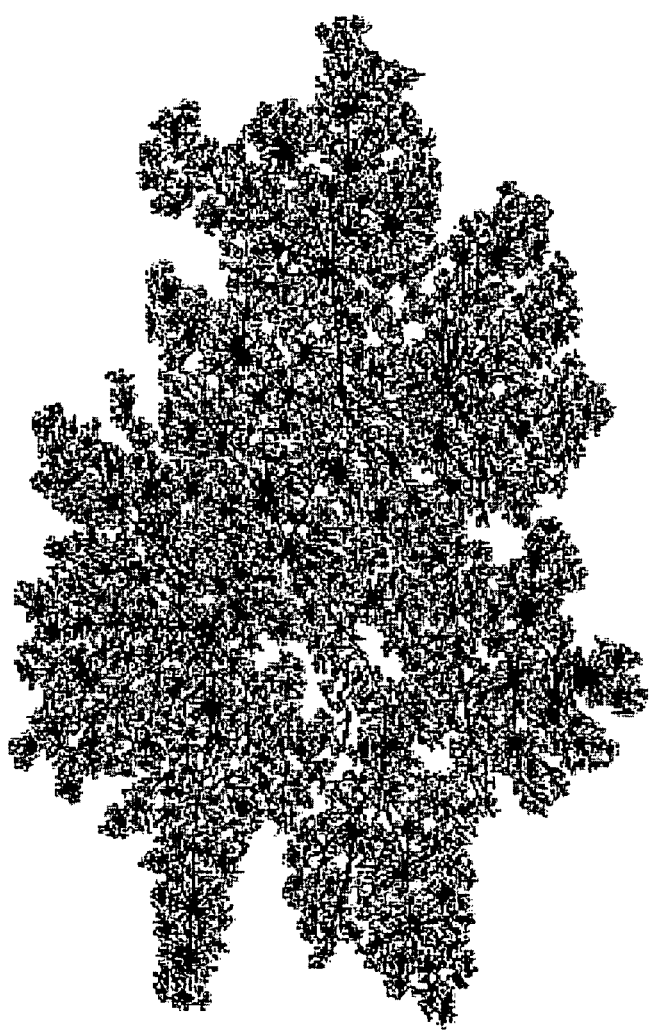
FIGS. 11 and 12 are schematics illustrating scalability, according to exemplary embodiments.
Figure 12:
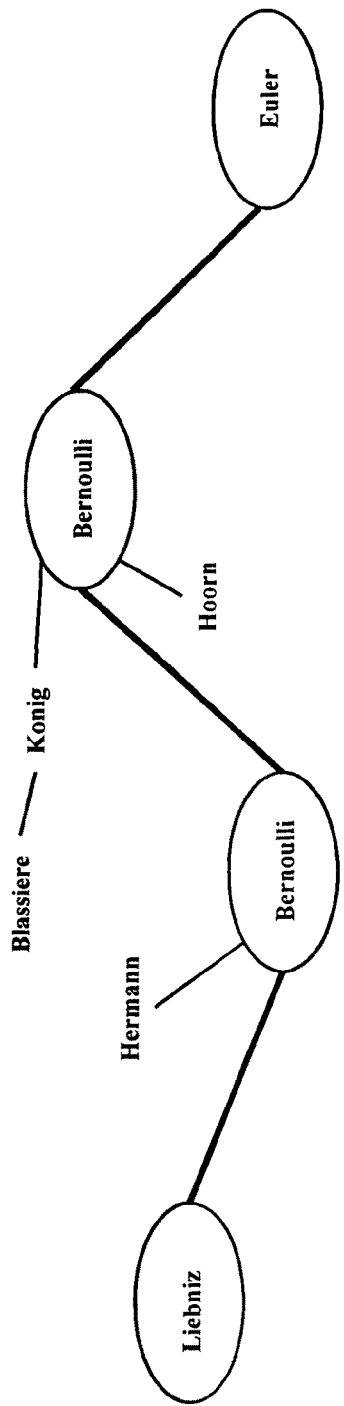

FIGS. 11 and 12 are schematics illustrating the scalability of the PRISM algorithm, according to exemplary embodiments. Here the PRISM algorithm (illustrated in FIG. 3) is applied to a large graph, for example, the second largest component of the known Mathematics Genealogy Project. Each node is a mathematician, and an edge from node i to node j means that that j is the first supervisor of i. Here the second largest component is considered with 11,766 vertices. The graph is disconnected and consists of thousands of components. This graph took thirty one (31) seconds to lay out using SFDP, and fifteen (15) seconds post-processing using PRISM for overlap removal. PRISM converges in eighty one (81) iterations. Important mathematicians (those with the most offspring) and important edges (those that lead to the largest subtrees) are highlighted with larger nodes and thicker edges. FIG. 11 illustrates an overall layout with nodal overlap removed, while FIG. 12 illustrates a close-up view of a small area near a center-left region of FIG. 11, with many famous mathematicians of early generations. Additional drawings of this and other components of the Mathematics Genealogy Project graph, including that of the largest component, are publicly available.

A number of algorithms have been proposed for removing node overlaps in undirected graph drawings. For graphs that are relatively large with nontrivial connectivities, these algorithms often fail to produce satisfactory results, either because the resulting drawing is too large (e.g., scaling, VORO, ODNLS), or the drawing becomes highly skewed (e.g., VPSC). In addition, many of the known algorithms do not scale well with the size of the graph in terms of computational costs. Exemplary embodiments thus present a new algorithm for removing overlaps that is both highly effective and efficient. The algorithm is shown to produce layouts that preserve the proximity relations between vertices, and scales well with the size of the graph. The algorithm has been applied to graphs of tens of thousands of vertices, and is able to give aesthetic, overlap-free drawings with compact area in seconds, which is not feasible with any algorithm known to us.

Figure 13:
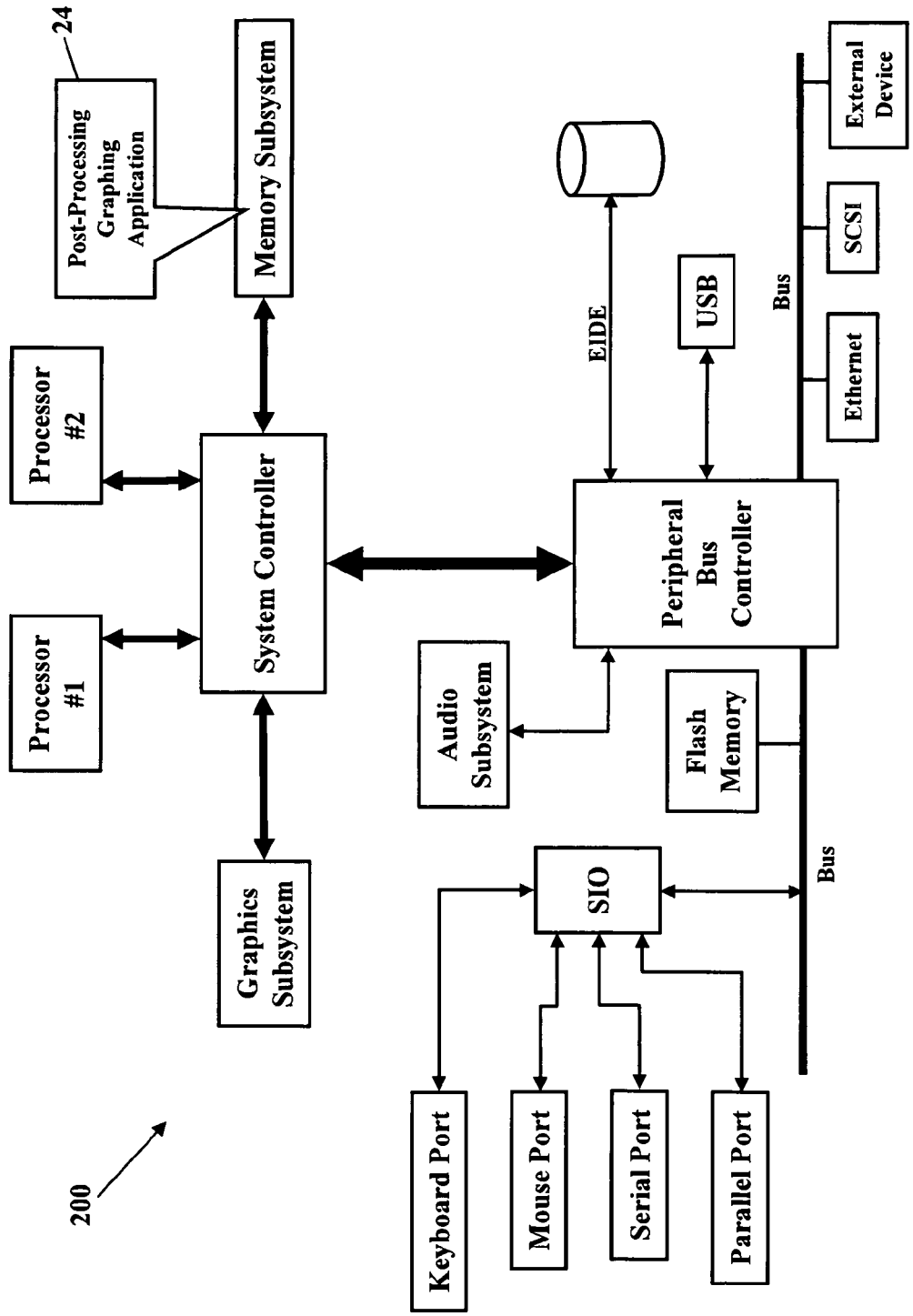
FIGS. 13 and 14 are schematics depicting other possible operating environments for additional aspects of the exemplary embodiments.

FIG. 13 is a schematic illustrating still more exemplary embodiments. FIG. 13 is a generic block diagram illustrating the post-processing graphing application 24 may operate within a processor-controlled device 200. The post-processing graphing application 24 may be stored in a memory subsystem of the processor-controlled device 200. One or more processors communicate with the memory subsystem and execute the post-processing graphing application 24. Because the processor-controlled device 200 illustrated in FIG. 13 is well-known to those of ordinary skill in the art, no detailed explanation is needed.

Figure 14:
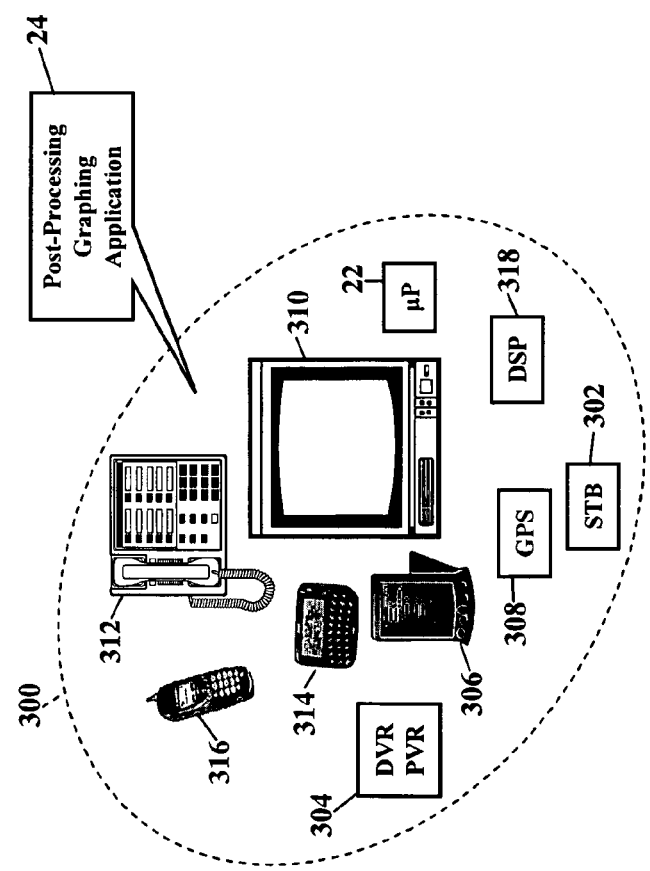

FIG. 14 depicts other possible operating environments for additional aspects of the exemplary embodiments. FIG. 14 illustrates that the exemplary embodiments may alternatively or additionally operate within various other devices 300. FIG. 14, for example, illustrates that the post-processing graphing application 24 may entirely or partially operate within a set-top box ("STB") (302), a personal/digital video recorder (PVR/DVR) 304, personal digital assistant (PDA) 306, a Global Positioning System (GPS) device 308, an interactive television 310, an Internet Protocol (IP) phone 312, a pager 314, a cellular/satellite phone 316, or any computer system, communications device, or processor-controlled device utilizing the processor 22 and/or a digital signal processor (DP/DSP) 318. The device 300 may also include watches, radios, vehicle electronics, clocks, printers, gateways, mobile/implantable medical devices, and other apparatuses and systems. Because the architecture and operating principles of the various devices 300 are well known, the hardware and software componentry of the various devices 300 are not further shown and described. If, however, the reader desires more details, the reader is invited to consult the following sources: LAWRENCE HARTE et al., GSM SUPERPHONES (1999); SIEGMUND REDL et al., GSM AND PERSONAL COMMUNICATIONS HANDBOOK (1998); and JOACHIM TISAL, GSM CELLULAR RADIO TELEPHONY (1997); the GSM Standard 2.17, formally known *Subscriber Identity Modules, Functional Characteristics* (GSM 02.17 V3.2.0 (1995-01))"; the GSM Standard 11.11, formally known as *Specification of the Subscriber Identity Module—Mobile Equipment (Subscriber Identity Module—ME) interface* (GSM11.11 V5.3.0 (1996-07))"; MICHEAL ROBIN & MICHEL POULIN, DIGITAL TELEVISION FUNDAMENTALS (2000); JERRY WHITAKER AND BLAIR BENSON, VIDEO AND TELEVISION ENGINEERING (2003); JERRY WHITAKER, DTV HANDBOOK (2001); JERRY WHITAKER, DTV: THE REVOLUTION IN ELECTRONIC IMAGING (1998); and EDWARD M. SCHWALB, ITV HANDBOOK: TECHNOLOGIES AND STANDARDS (2004).

Figure 15:
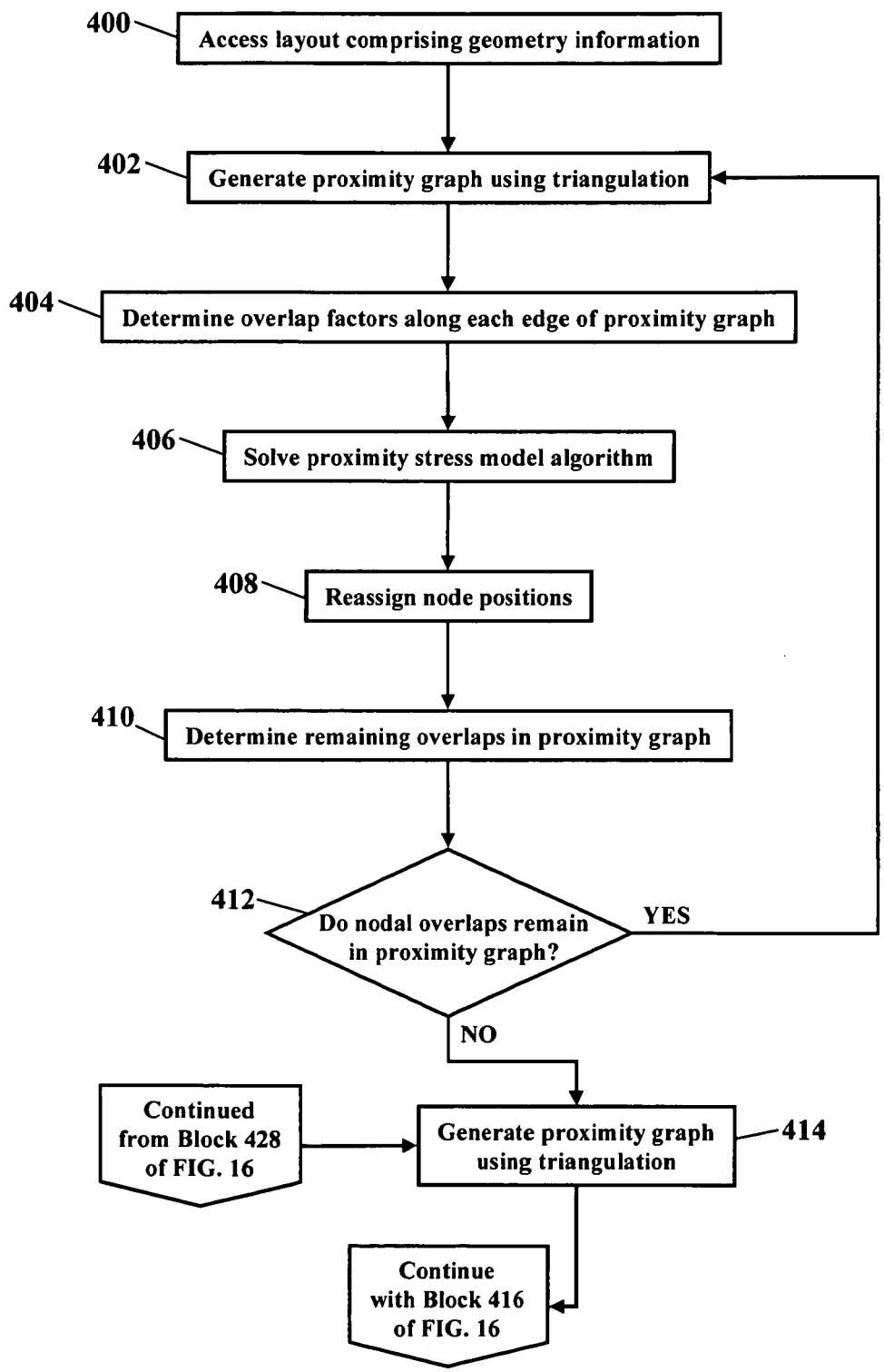
FIGS. 15-16 are flowcharts illustrating a method of graphing data, according to exemplary embodiments.
Figure 16:
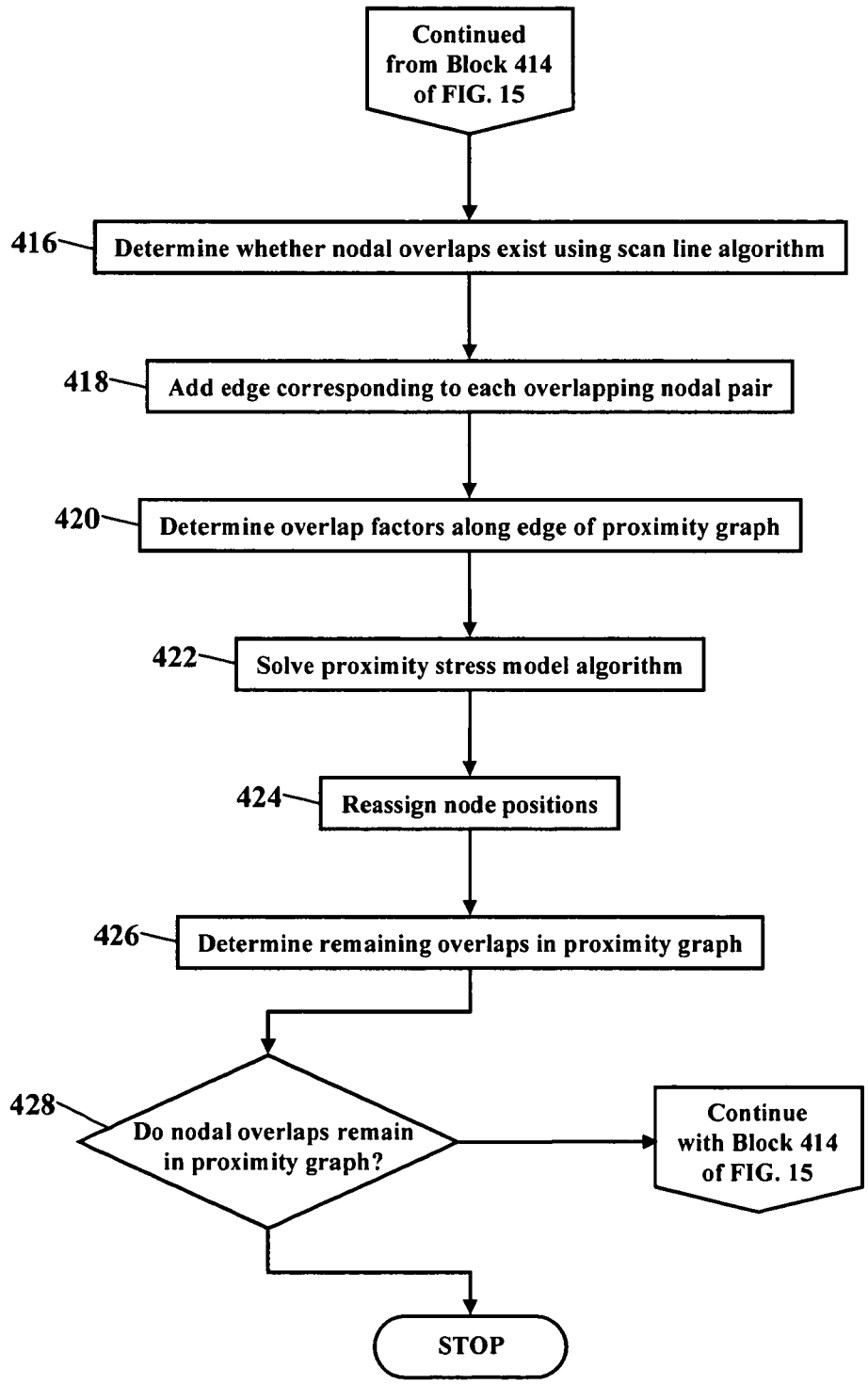

FIGS. 15 and 16 are a flowchart illustrating a method of graphing data, according to exemplary embodiments. A layout is retrieved comprising geometry information, such as locations for vertices (Block 400). A proximity graph is generated using a Delauney triangulation (Block 402). Overlap factors are determined along each edge of the proximity graph (Block 404). A proximity stress model algorithm is solved (Block 406). Node positions may be reassigned (Block 408). Remaining overlaps are determined in the proximity graph (Block 410). If nodal overlaps remain in the proximity graph (Block 412), then the proximity graph is again generated using the Delauney triangulation (Block 402). If no nodal overlaps remain (Block 412), then generate a proximity graph using a Delauney triangulation (Block 414). Determine whether nodal overlaps exist using a scan line algorithm (Block 416). An edge is added to the proximity graph that corresponds to each overlapping nodal pair (Block 418). Overlap factors are determined along each edge of the proximity graph (Block 420). The proximity stress model algorithm is solved (Block 422). Node positions may be reassigned (Block 424). Remaining overlaps are again determined (Block 426). If nodal overlaps still remain in the proximity graph (Block 428), then again the proximity graph is again generated using the Delauney triangulation (Block 414).

Exemplary embodiments may be physically embodied on or in a computer-readable storage medium. This computer-readable medium may include CD-ROM, DVD, tape, cassette, floppy disk, memory card, and large-capacity disks. This computer-readable medium, or media, could be distributed to end-subscribers, licensees, and assignees. These types of computer-readable media, and other types not mention here but considered within the scope of the exemplary embodiments. A computer program product comprises processor-executable instructions for graphing data.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

What is claimed is:

1. A method of graphing data, comprising:
generating, by a processor, a first layout from a spring-electrical algorithm, the first layout comprising multiple vertices and a location for each vertex in the multiple vertices;
generating a second layout that removes overlapping nodes produced by the spring-electrical algorithm by:
generating a current location for each vertex in the first layout;
confining each vertex in the first layout to a proximity location about the current location;
determining a vertex and another vertex overlap;
moving the vertex within the proximity location to remove the overlap;
generating a first proximity graph for the first layout using triangulation;
generating a second proximity graph for the second layout using the triangulation;
measuring distances between vertices along edges of the first proximity graph;
measuring the distances between the vertices along the edges of the second proximity graph;
calculating edge length ratios of lengths of the edges between the first proximity graph and the second proximity graph;
calculating a mean of the edge length ratios; and
measuring a dissimilarity of the edge length ratios using a normalized standard deviation $$\sigma_{dist}(x^0, x) = \frac{\sqrt{\frac{\sum_{\{i,j\} \in E_P} (r_{ij} - \bar{r})^2}{|E_P|}}}{\bar{r}},$$

where $$\bar{r} = \frac{1}{|E_P|} \sum_{\{i,j\} \in E_P} r_{ij}$$

is the mean of the edge length ratios, $x^0$ and $x$ denote the first layout and the second layout, and $E_P$ is a set of edges in the triangulation.

2. The method according to claim 1, further comprising performing a Delaunay triangulation to generate the first proximity graph.

3. The method according to claim 1, further comprising determining the overlap along an edge of the first layout.

4. The method according to claim 1, further comprising solving a proximity stress model algorithm.

5. The method according to claim 1, further comprising drawing a sphere that passes through the vertex and another vertex.

6. The method according to claim 5, further comprising determining no other vertexes in the multiple vertices have the current location lying within an interior of the sphere.

7. The method according to claim 1, further comprising determining an overlap factor.

8. The method according to claim 1, further comprising finding a minimum of the spring electrical model algorithm.

9. The method according to claim 1, further comprising generating the proximity location for each vertex.

10. The method according to claim 1, further comprising merging the current location from the first layout with the proximity location.

11. The method according to claim 1, further comprising minimizing a cost function associated with the first layout.

12. A system, comprising:
a processor; and
memory storing instructions that when executed cause the processor to perform operations, the operations comprising:
generating a first layout from a spring-electrical algorithm, the first layout comprising multiple vertices and a location for each vertex in the multiple vertices;

generating a second layout that removes overlapping nodes produced by the spring-electrical algorithm by:
  generating a current location for each vertex in the first layout;
  confining each vertex in the first layout to a proximity location about the current location;
  determining a vertex and another vertex overlap;
  moving the vertex within the proximity location to remove the overlap;
generating a first proximity graph for the first layout using triangulation;
generating a second proximity graph for the second layout using the triangulation;
measuring distances between vertices along edges of the first proximity graph;
measuring the distances between the vertices along the edges of the second proximity graph;
calculating edge length ratios of lengths of the edges between the first proximity graph and the second proximity graph;
calculating a mean of the edge length ratios; and
measuring a dissimilarity of the edge length ratios using a normalized standard deviation $$\sigma_{dist}(x^0, x) = \frac{\sqrt{\frac{\sum_{\{i,j\} \in E_p} (r_{ij} - \bar{r})^2}{|E_p|}}}{\bar{r}},$$

where $$\bar{r} = \frac{1}{|E_P|} \sum_{\{i,j\} \in E_P} r_{ij}$$

is the mean of the edge length ratios, $x^0$ and $x$ denote the first layout and the second layout, and $E_P$ is a set of edges in the triangulation.

13. The system according to claim 12, wherein the operations further comprise performing a Delaunay triangulation.

14. The system according to claim 12, wherein the operations further comprise determining the overlap along an edge of the first layout.

15. The system according to claim 12, wherein the operations further comprise solving a proximity stress model algorithm.

16. A memory device storing instructions that when executed cause a processor to perform operations, the operations comprising:

generating a first layout from a spring-electrical algorithm, the first layout comprising multiple vertices and a location for each vertex in the multiple vertices;
generating a second layout that removes overlapping nodes produced by the spring-electrical algorithm by:
  generating a current location for each vertex in the first layout;
  confining each vertex in the first layout to a proximity location about the current location;
  determining a vertex and another vertex overlap;
  moving the vertex within the proximity location to remove the overlap;
generating a first proximity graph for the first layout using triangulation;
generating a second proximity graph for the second layout using the triangulation;
measuring distances between vertices along edges of the first proximity graph;
measuring the distances between the vertices along the edges of the second proximity graph;
calculating edge length ratios of lengths of the edges between the first proximity graph and the second proximity graph;
calculating a mean of the edge length ratios; and
measuring a dissimilarity of the edge length ratios using a normalized standard deviation $$\sigma_{dist}(x^0, x) = \frac{\sqrt{\frac{\sum_{\{i,j\} \in E_p} (r_{ij} - \bar{r})^2}{|E_p|}}}{\bar{r}},$$

where $$\bar{r} = \frac{1}{|E_P|} \sum_{\{i,j\} \in E_P} r_{ij}$$

is the mean of the edge length ratios, $x^0$ and $x$ denote the first layout and the second layout and $E_P$ is a set of edges in the triangulation.

17. The memory device of claim 16, wherein the operations further comprise performing a Delaunay triangulation.

18. The memory device of claim 16, wherein the operations further comprise determining the overlap along an edge of the first layout.

19. The memory device of claim 16, wherein the operations further comprise solving a proximity stress model algorithm.

* * * * *